US011586383B2

(12) United States Patent
Boehm et al.

(10) Patent No.: US 11,586,383 B2
(45) Date of Patent: Feb. 21, 2023

(54) COMMAND BLOCK MANAGEMENT

(71) Applicant: Micron Technology, Inc., Boise, ID (US)

(72) Inventors: Aaron P. Boehm, Boise, ID (US); Scott E. Schaefer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 16/579,153

(22) Filed: Sep. 23, 2019

(65) Prior Publication Data

US 2020/0117393 A1  Apr. 16, 2020

Related U.S. Application Data

(60) Provisional application No. 62/746,284, filed on Oct. 16, 2018.

(51) Int. Cl.
*G06F 3/06* (2006.01)
*G06F 21/79* (2013.01)
*G06F 12/14* (2006.01)

(52) U.S. Cl.
CPC .......... *G06F 3/0659* (2013.01); *G06F 3/0604* (2013.01); *G06F 3/0673* (2013.01);
(Continued)

(58) Field of Classification Search
None
See application file for complete search history.

(56) References Cited

U.S. PATENT DOCUMENTS 4,860,194 A * 8/1989 Harrison ............... G06F 3/0601
360/98.01
5,463,757 A * 10/1995 Fandrich ............... G11C 16/10
711/103
(Continued)

FOREIGN PATENT DOCUMENTS

CN  1019440003 A  *  1/2011  ............... G06F 3/06
KR  20090065531 A      6/2009

OTHER PUBLICATIONS

INCITS. "Information Technology—AT Attachment with Packet Interface—7." Apr. 2004. Vol. 1. Rev. 4b. pp. 214-216.*

(Continued)

*Primary Examiner* — Nathan Sadler
(74) *Attorney, Agent, or Firm* — Holland & Hart LLP

(57) ABSTRACT

Methods, systems, and devices for command block management are described. A memory device may receive a command (e.g., from a host device). The memory device may determine whether the command is defined by determining if the command is included within a set of defined commands. In the case that a received command is absent from the set of defined commands (e.g., the command is undefined), the memory device may block the command from being decoded for execution by the memory device. In some cases, the memory device may switch from a first operation mode to a second operation mode based on receiving an undefined command. The second operation mode may restrict an operation of the memory device, while the first mode may be less restrictive, in some cases. Additionally or alternatively, the memory device may indicate the undefined command to another device (e.g., the host device).

25 Claims, 14 Drawing Sheets

(52) U.S. Cl.
CPC .......... *G06F 21/79* (2013.01); *G06F 12/1441* (2013.01); *G06F 12/1466* (2013.01)

(56) References Cited

U.S. PATENT DOCUMENTS

| | | | |
|---|---|---|---|
| 5,754,557 A | 5/1998 | Andrewartha | |
| 11,410,713 B2* | 8/2022 | Wu | G11C 11/4076 |
| 2002/0064079 A1* | 5/2002 | Sato | G11C 11/4074 |
| | | | 365/227 |
| 2005/0010710 A1* | 1/2005 | Yim | G06F 3/0605 |
| | | | 710/307 |
| 2006/0075282 A1* | 4/2006 | Borkenhagen | G11C 29/56008 |
| | | | 714/5.11 |
| 2007/0021193 A1* | 1/2007 | Akita | G07F 17/32 |
| | | | 463/29 |
| 2007/0245036 A1* | 10/2007 | Fekih-Romdhane | |
| | | | G11C 7/1078 |
| | | | 710/5 |
| 2008/0162784 A1 | 7/2008 | Obereiner et al. | |
| 2008/0168112 A1 | 7/2008 | Lyons et al. | |
| 2010/0077138 A1* | 3/2010 | Bauernfeind | G11B 19/122 |
| | | | 711/104 |
| 2010/0332731 A1* | 12/2010 | Ou | G06F 13/16 |
| | | | 711/103 |
| 2012/0102334 A1* | 4/2012 | O'Loughlin | G06F 12/1408 |
| | | | 713/189 |
| 2012/0254994 A1 | 10/2012 | Sallam | |
| 2012/0271986 A1 | 10/2012 | Lo et al. | |
| 2014/0068238 A1 | 3/2014 | Jaber et al. | |
| 2014/0181453 A1* | 6/2014 | Jayasena | G06F 13/1694 |
| | | | 711/170 |
| 2014/0258786 A1 | 9/2014 | Resnick | |
| 2015/0134882 A1* | 5/2015 | Lin | G06F 3/0613 |
| | | | 711/103 |
| 2019/0121720 A1* | 4/2019 | Jung | G06F 11/3656 |
| 2020/0272735 A1* | 8/2020 | Leonhardi | G06F 11/079 |
| 2021/0312961 A1* | 10/2021 | Wu | G11C 7/1045 |

OTHER PUBLICATIONS

English abstract of CN 1019440003A.*
PCI Express. PCI Express® Base Specification Revision 3.1a. Dec. 2015. PCI Express. pp. 123-132, 503-540, 682-699, 752-770.*
ISA/KR, International Search Report and Written Opinion of the International Searching Authority, Int'l. Appl. No. PCT/US2019/054483, dated Jan. 21, 2020, Korean Intellectual Property Office, Seo-gu, Daejeon, Republic of Korea, 14 pgs.
European Search Report received for EP Patent Application No. 19872679.6, dated Feb. 8, 2022, 9 pages.

* cited by examiner

COMMAND BLOCK MANAGEMENT

CROSS REFERENCE

The present application for patent claims priority to U.S. Provisional Patent Application No. 62/746,284 by Boehm et al., entitled "COMMAND BLOCK MANAGEMENT," filed Oct. 16, 2018, which is assigned to the assignee hereof and is expressly incorporated by reference in its entirety herein.

BACKGROUND

The following relates generally to a system that includes at least one memory device and more specifically to command block management.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Types of memory devices include magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, SRAM, may lose their stored state when disconnected from an external power source. Dynamic memory devices, e.g., DRAM, SDRAM, may lose a stored state over time unless they are periodically refreshed.

In some cases, a memory device (e.g., a DRAM device) may be configured to recognize a set of commands corresponding to unique instructions (e.g., read, write, refresh). For example, if a memory device receives a command, the memory device may execute the command according to the indicated instruction. Improving memory devices, generally, may include increasing memory cell density, increasing read/write speeds, increasing reliability, increasing data retention, reducing power consumption, or reducing manufacturing costs, among other metrics. Improving a memory device's operation based on received commands is desired.

DETAILED DESCRIPTION

Figure 1:
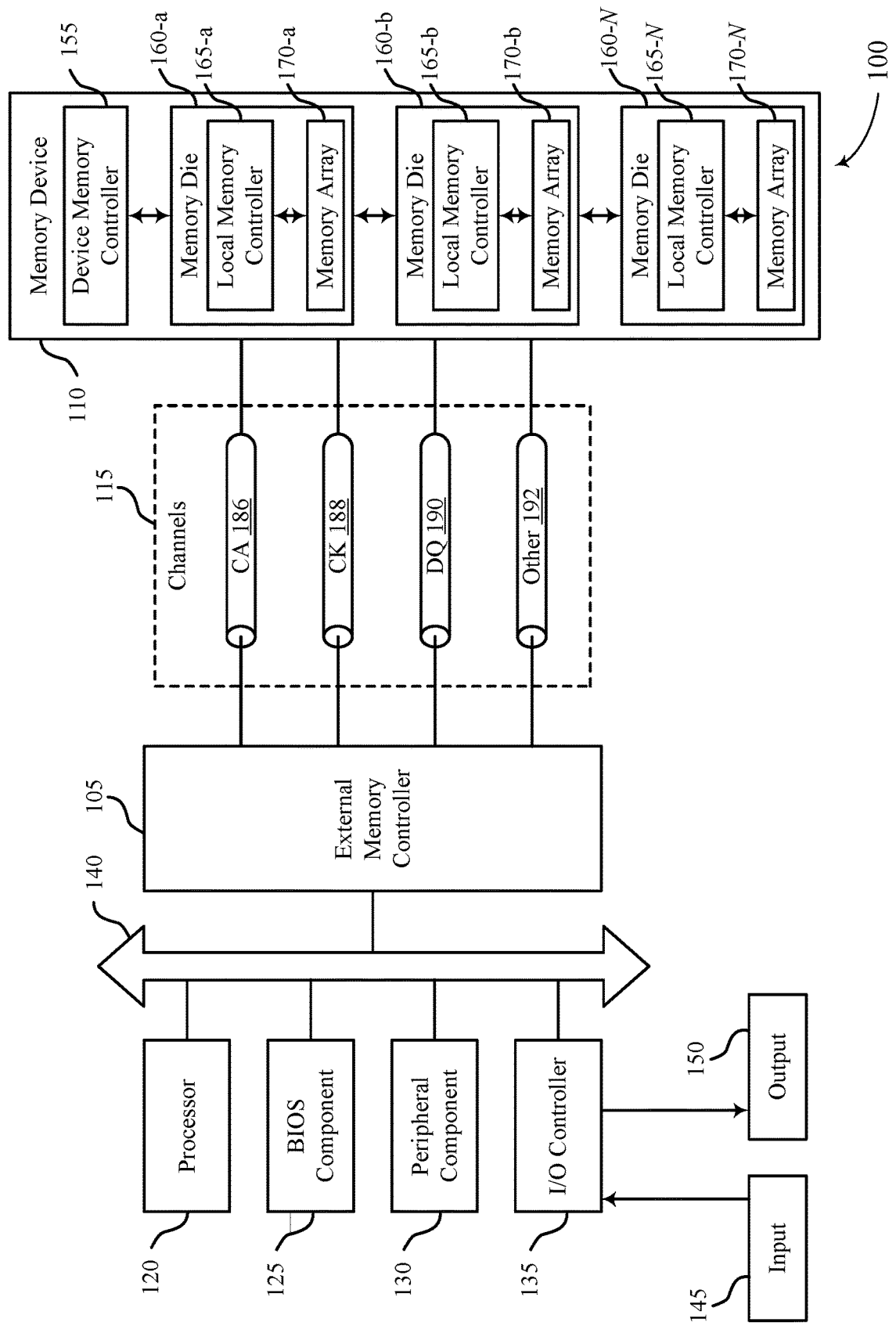
FIG. 1 illustrates an example of a system that supports command block management as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations (e.g., automotive vehicles, in some cases with autonomous or semi-autonomous driving capabilities) may be subject to increased reliability constraints. As such, memory devices (e.g., DRAM) for some applications may be expected to operate with a reliability subject to relatively higher industry specifications (e.g., higher reliability constraints).

Some memory devices may be configured to recognize a set of defined commands corresponding to unique instructions (e.g., read, write, refresh) or addresses (e.g., row address, column address). For example, if a memory device receives a defined command, the memory device may execute the command according to the indicated instruction and address. In some cases, there may be commands that are not defined for the memory device (e.g., commands that do not correspond to a defined instruction and/or defined address). That is, there may be commands or command sequences that do not correspond to a defined operation or set of operations.

For example, commands may be conveyed by the states of pins of the memory device, and a subset of the possible combinations of the pins may not correspond to defined operations for the memory device. In the case that a memory device receives an undefined command or command sequence, the response of the memory device may be variable or unknown. For example, a memory device may not have a defined operation associated with an undefined command and as such, may execute variable operations in response to the undefined command. In some cases, undefined commands leading to variable operations may leave the memory device susceptible to malicious attacks. That is, a command or series of commands may be sent to the memory device in order to cause the memory device to behave erratically.

Techniques for blocking undefined commands from execution at the memory device are described. For example, the memory device may determine whether a command is defined prior to decoding and executing the command. The memory device may identify a set of defined commands for the memory device. When the memory device receives a command or a sequence of commands, the memory device may determine whether each command of the received commands is defined by determining if each received command is absent or present within the set of defined commands. In the case that a received command is absent from the set of defined commands (e.g., the command is undefined), the memory device may block the command from being decoded for execution by the memory device. In one example, the memory device may activate a safe mode for the memory array associated with the detected undefined command. The safe mode may restrict the operation of the memory device (e.g., by limiting the type of commands executed, by limiting the portion of a memory array of the memory device for executing commands). Additionally or alternatively, the memory device may transmit a notification to a host device indicating the undefined command. Thus, the memory device may prevent the execution of undefined commands in order to improve the reliability of the memory device (e.g., by decreasing variable behavior of the memory device).

Figure 2:
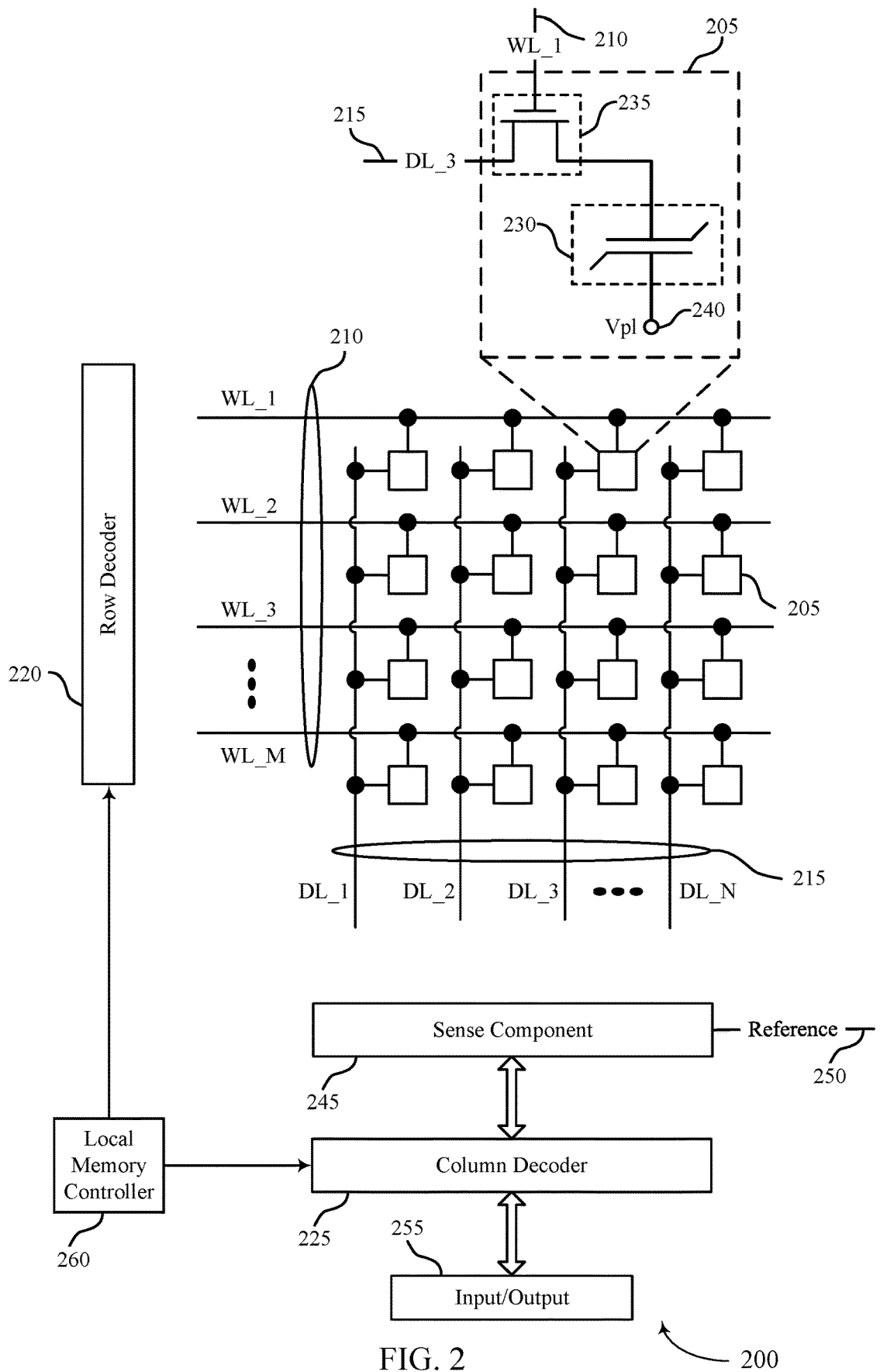
FIG. 2 illustrates an example of a memory sub-array that supports command block management as disclosed herein.
Figure 3:
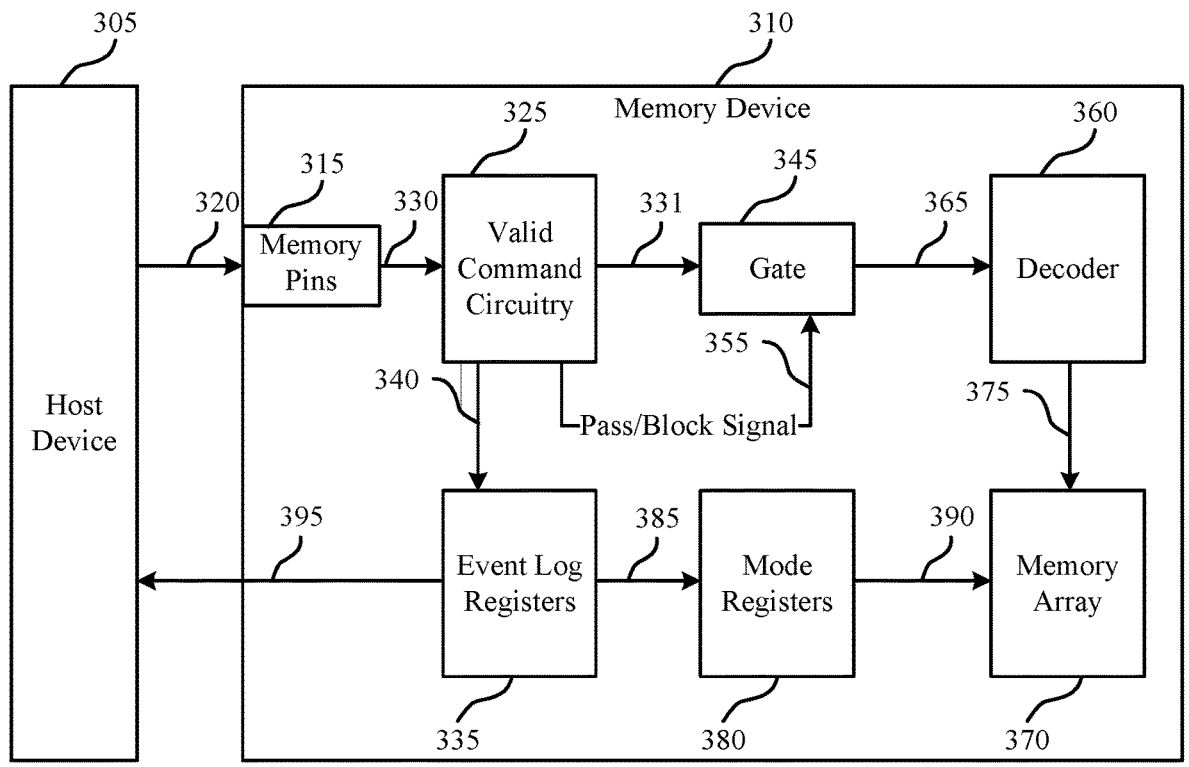
FIG. 3 illustrates an example of a system that supports command block management as disclosed herein.

Features of the disclosure are initially described in the context of a memory system and device with reference to FIGS. 1, 2, and 3. Features of the disclosure are described in the context of a process flow with reference to FIGS. 4, 5, 6, and 7. These and other features of the disclosure are further illustrated by and described with reference to apparatus diagrams and flowcharts in FIGS. 8-14 that relate to command block management.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some examples, system 100 is a graphics card. In some cases, the host device may refer to the hardware, firmware, software, or a combination thereof that implements the functions of the external memory controller 105. In some cases, the external memory controller 105 may be referred to as a host or host device.

In some cases, the memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth.

In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any number of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the number of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120).

The memory device 110 may store a set of defined commands corresponding to unique instructions (e.g., read, write, refresh) or addresses (e.g., row address, column address). In some cases, the memory device 110 may determine that a command (e.g., received from the external memory controller 105) is defined prior to executing the command at a memory array 170. Further, the memory device 110 may block undefined commands (e.g., commands that do not correspond to a defined instruction and/or defined address) and by not decoding and/or executing undefined commands. In one example, the memory device 110 may activate a safe mode for a memory array 170 associated with the undefined command. The safe mode may restrict the execution of commands at a certain portion of the memory array 170 (e.g., a bank or banks associated with the undefined command). Additionally or alternatively, the safe mode may restrict the type of commands for execution (e.g., the safe mode may allow an execution of read commands while restricting an execution of write commands). In some examples, the memory device 110 may transmit a notification to the external memory controller 105 related to the undefined command.

In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. In some cases, the clock signal may be a 1.5 GHz signal. A CK channel 188 may include any number of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any number of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any number of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any number of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

FIG. 2 illustrates an example of a memory sub-array 200 in accordance with various examples of the present disclosure. The memory sub-array 200 may be an example of at least a portion of the memory dice 160 described with reference to FIG. 1. In some cases, the memory sub-array 200 may be referred to as a memory die, memory chip, a memory device, or an electronic memory apparatus. For example, a memory device such as a memory chip may include multiple instances of sub-array 200, with additional row, address, bank, or bank group decoding used to select one or more sub-arrays from the multiple instances for access operations. The memory sub-array 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line or configuring a multiplexer to map the line to a given signal.

The memory sub-array 200 may include the access lines (e.g., the word lines 210 and the digit lines 215) arranged in a grid-like pattern. Memory cells 205 may be positioned at intersections of the word lines 210 and the digit lines 215. By biasing a word line 210 (e.g., applying a voltage to the word line 210), a memory cell 205 may be accessed via the digit line 215 at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may select a digit line 215 based on the received column address. For example, the memory sub-array 200 may include multiple word lines 210, labeled WL_1 through WL_M, and multiple digit lines 215, labeled DL_1 through DL_N, where M and N depend on the size of the memory array. Thus, by activating a word line 210, e.g., WL_1, the memory cells 205 in a given row may be accessed. The digit lines 215 (e.g., DL_1, . . . , DL N) carry the data for writing or reading from the memory cells in the row. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., via charge sharing) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include amplifiers (e.g., transistor amplifiers) to detect and amplify a difference in the signals. The detected logic state of memory cell 205 may be output through column decoder 225 as output 255. In some cases, the aspects of sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, aspects of the row decoder 220, column decoder 225, or sense component 245 may be co-located with the local memory controller 260. The local memory controller 260 may be configured to receive commands and/or data from an external memory controller 105 (or a device memory controller 155 described with reference to FIG. 1) and translate the commands and/or data into information that can be used by the memory sub-array 200.

The local memory controller 260 may determine whether received commands are defined prior to translating the commands into information that can be used by the memory sub-array 200. That is, the local memory controller 260 may compare received commands to a set of defined commands. In the event that the received command is included in the set of defined commands, the local memory controller may translate the commands into information that can be used by the memory sub-array 200. Alternatively, in the event that the received command is not included in the set of defined commands (e.g., the received command is undefined/invalid), the local memory controller 260 may block the command from being translated and propagated to the memory sub-array 200. In one example, the local memory controller 260 may activate a safe mode for the memory sub-array 200 associated with the undefined command. The safe mode may restrict the execution of commands at a certain portion of the sub-array 200 (e.g., a bank or banks associated with the undefined command). Additionally or alternatively, the safe mode may restrict the type of commands for execution (e.g., the safe mode may allow an execution of read commands while restricting an execution of write commands). Further, the local memory controller 260 may transmit a notification a host device (e.g., an external memory controller 105 as described with reference to FIG. 1) related to the undefined command.

The local memory controller 260 may further be configured to perform one or more operations on the memory sub-array 200, and communicate data from the memory sub-array 200 to the external memory controller 105 (or the device memory controller 155) in response to performing the one or more operations. The local memory controller 260 may generate row and column address signals to activate the target word line 210 and select the target digit line 215. The local memory controller 260 may also generate and control various voltages or currents used during the operation of the memory sub-array 200. In general, the amplitude, shape, or duration of an applied voltage or current discussed herein may be adjusted or varied and may be different for the various operations discussed in operating the memory sub-array 200.

In some cases, the local memory controller 260 may be configured to perform a write operation (e.g., a programming operation) on one or more memory cells 205 of the memory sub-array 200. During a write operation, a memory cell 205 of the memory sub-array 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 (e.g., applying a voltage to the word line 210), to access a row including the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory sub-array 200. During a read operation, the logic state stored in a memory cell 205 of the memory sub-array 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 (e.g., applying a voltage to the word line 210), to access a row including the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation (e.g., by selecting data read from digit lines 215 using column decoder 225).

The row access logic 265 and the column access logic 275 may determine a subset of the array corresponding to the target memory cell 205. That is, the row access logic 265 and the column access logic 275 may be configured to determine the word line or lines 210 activated during the read operation and the digit line or lines 215 carrying the data associated with the read operation. The row access logic 265 and the column access logic 275 may transmit an indication of the determined subset of the array (e.g., to a verifier as discussed herein). In some examples, the indication of the subset of the array may indicate the subset along one or more dimensions of the array. For example, the indication of the subset of the array may indicate the word line or lines 210 being activated during the read operation (e.g., a row MAT indication). Additionally or alternatively, the indication of the subset of the array may indicate the digit line or lines 215 selected during the read operation (e.g., a column MAT indication).

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

FIG. 3 illustrates an example of a system 300 that supports techniques for command block management. The system 300 may include one or more components described herein with reference to FIGS. 1 and 2. For example, the system 300 may include a host device 305, which may be an example of the external memory controller 105 as described with reference to FIG. 1 and a memory device 310, which may be an example of the memory device 110, the memory dice 160, or the memory die 200 as described with reference to FIGS. 1 and 2. The memory device 310 may include a memory array 370, which may be an example of the memory arrays 170 as described with reference to FIG. 1. The memory device 310 may also include valid command circuitry 325, gate 345, mode registers 380, and event log registers 335.

Host device 305 may send commands to memory device 310 via a channel 320, which may be an example of a channel 115 or CA channel 186 as discussed with reference to FIG. 1. The memory device 310 may receive the commands at memory pins 315 which may, in some cases, be coupled with an input buffer. The commands may include individual commands (e.g., individual read or write commands), or burst commands (multiple sequential commands). The command or commands may be transmitted from the memory pins 315 (or input buffers coupled with the memory pins 315) to the valid command circuitry 325 via bus 330. The command or commands received from the host device 305 may be propagated through the valid command circuitry 325 to the gate 345. In some cases, the valid command circuitry 325 may cause the gate 345 to propagate defined commands (e.g., commands that are known by the memory device 310) to the decoder 360 and block commands (e.g., not propagating commands to the decoder 360) that are not defined. In this way, the memory device 310 may prevent undefined commands from being executed, thus increasing a reliability of the memory device 310.

A defined command may be a command associated with a defined instruction (e.g., a read instruction, a write instruction, a refresh instruction, etc.) and/or a defined address (e.g., row address, column address). In some cases, there may be one or more possible commands that may not be defined for the memory device 310. For example, a command may be indicated by three bits (e.g., received via three memory pins 315) such that there are be eight different possible bit combinations that the memory device 310 may receive. However, the memory device 310 may have just five defined commands (e.g., five of the eight combinations are defined, each corresponding to one of five distinct instructions). That is, there may be three possible received commands that may not be associated with a defined instruction. In some cases, a number of defined addresses (e.g., addresses corresponding to a location of the memory array 370) may be based on the size of the memory array 370. These numbers are exemplary and for illustrative clarity only, and it is to be understand that a command may be indicated by any number of bits and received over any number of pins, including via any order of signaling (e.g., binary or non-binary signaling).

The valid command circuitry 325 may determine whether a received command is included in a set of commands that are defined for the memory device 310. The memory device 310 may store a set of defined commands. In a first example, the set of defined commands may be a preconfigured set that is fixed by a vendor (e.g., during assembly) such as a DRAM vendor. The preconfigured set of defined commands may be non-programmable (e.g., hard-wired or stored in Read Only Memory (ROM)) or one-time-programmable (OTP) (e.g., stored in one or more fuses or anti-fuses or one or more memory OTP memory). In a second example, the set of defined commands may programmable after assembly (e.g., by the host 305, by the original equipment manufacturer). In this example, the memory device 310 may receive the set of valid commands from the host device 305 and may store the set of valid commands in a memory (e.g., register, volatile memory, or non-volatile memory). The valid command circuitry 325 may utilize circuitry (e.g., a look-up table (LUT), a simplified processor circuitry implementing a logic function) to determine whether the received command is within the set of defined commands. In some cases, the valid command circuitry 325 may determine whether a sequence of commands is part of a defined set of command sequences.

The valid command circuitry 325 may transmit a pass/block signal 355 to the gate 345 based on whether the command received from the host 305 is within the defined set of commands. For example, the valid command circuitry 325 may set the pass/block signal 355 to a first logic state to signal the gate 345 to propagate the command received via bus 331 and may set the pass/block signal 355 to a second logic state to signal the gate 345 to block the command received via bus 331. The gate 345 may be a combination of logical gates or pass gates. For example, the gate 345 may set an instruction of internal command bus 365 to an instruction of the received command when it identifies the first logic state on the pass or block signal 355 and to a no-operation (NOP) instruction when it identifies the second logic state on the pass or block signal 355.

In some cases, the valid command circuitry 325 may be different than decoder 360. For example, decoder 360 may be a custom logic or transistor level circuit, while valid command circuitry 325 may be a synthesized logic block (e.g., synthesized from a hardware description language). In some cases, the decoder 360 may use switched logic gates while valid command circuitry 325 uses static combinatorial logic gates. In some cases, the decoder 360 may map virtual addresses to physical addresses within memory array 370, while valid command circuitry 325 may determine if the virtual addresses are within a valid range of addresses, but may not map the addresses to physical addresses of memory array 370.

The valid command circuitry 325 may transmit an indication of an invalid command 340 (e.g., a command that is not included within a set of defined commands) to the event log registers 335. The event log registers 335 may store the indication of the invalid command 340. In some cases, the event log registers 335 may further store the invalid command itself. In the event that the memory device 310 receives a sequence of commands from the host device 305, the event log registers 335 may store each of the commands of the sequence of commands that is invalid. In some instances, the valid command circuitry 325 may transmit the indication of the invalid command 340 to the mode registers 380.

The event log registers 335 may record a number of invalid commands received from the host device 305. For example, the event log registers 335 may include a counting register for storing a number of invalid commands. Here, the counting register may increment a stored value when the event log registers 335 receive the indication of the invalid command 340 from the valid command circuitry 325. In some cases, the number of recorded invalid commands may be based on a number of invalid commands indicated by the valid command circuitry 325 within a given time frame. The number of recorded invalid commands may be compared to a threshold. In some cases, if the number of recorded invalid commands satisfies the threshold (e.g., the number of recorded invalid commands is greater than or equal to the threshold), the event log register 335 may transmit an indication of the satisfied threshold to the mode registers 380 via bus 385. The memory device 310 may utilize the threshold to determine a potential malicious attack. That is, when the threshold is met, the memory device 310 may determine that the number of invalid commands may be associated with a malicious attack. The threshold may be preconfigured (e.g., set during assembly) or programmable (e.g., programmable by a host device 305). The threshold may be one command (e.g., a single invalid command may trigger the indication of the satisfied threshold), or multiple invalid commands, in some cases.

The mode registers 380 may indicate a mode of operation for the memory device 310. That is, the memory device 310 may operate according to modes of operation, which may include an access mode and a safe mode. In the access mode, the memory device 310 may execute commands (e.g., the defined commands) received from host device 305 at the indicated portion of memory array 370. However, during the safe mode, the memory device 310 may apply a restriction of access to at least a portion of the memory array 370. For example, in the safe mode, the memory device 310 may block commands to one or more portions (e.g., rows, columns, sub-arrays, banks, bank groups) of the memory array 370 subject to the restriction of access. In some other examples, the memory device 310 may not execute any defined commands during the safe mode. In some other examples, the memory device 310 may not execute certain types of defined commands during the safe mode (e.g., the memory device 310 may execute read commands during a safe mode but may not execute other types of commands). In some other examples, the memory device 310 may refresh some (e.g., certain rows, sub-arrays, banks, bank groups) or all of the memory array 370 during the safe mode (e.g., autonomously or automatically). In some instances, the mode registers 380 may indicate the safe mode based on receiving the indication that the number of recorded invalid commands satisfies the threshold (e.g., from the event log registers 335). In some other instances, the mode registers 380 may indicate the safe mode based on receiving the indication of the invalid command 340 from the valid command circuitry 325. For example, the mode registers 380 may set a safe mode register to a logic '1' indicating the safe mode. During the safe mode, the memory device 310 may operate the portion of the memory array associated with the safe mode (e.g., the rows, sub-arrays, bank(s), or bank groups operating according to the safe mode) in a self-refresh mode.

The memory device 310 may maintain the safe mode for a predetermined period of time (e.g., time period or number of clocks), or until receiving a command from the host device 305 to return to the access mode. The command may indicate a reset procedure, which may transition the memory device 310 from the safe mode to the access mode. The command to reset to the access mode may include a single command, or a sequence of commands that may be known by host device 305 and by the memory device 310. The sequence may act as a guard key. Here, host device 305 may transmit the sequence of commands (e.g., guard key) to memory device 310. The memory device 310 (e.g., at the decoder 360 or valid command circuitry 325) may recognize the sequence of commands and transition the portion of the memory array 370 from the safe mode to the access mode.

The event log registers 335 may provide a feedback to the host device 305 related to the invalid command. In some cases, the feedback may include an indication of the invalid command. Additionally or alternatively, the feedback may include the invalid command received at the memory pins 315. For example, the memory device 310 may include the invalid command in the feedback in response to the host device 305 transmitting a request to the memory device 305 for an indication of the invalid command received at the memory pins 315. In another example, the feedback may include an indication that the threshold has been satisfied (e.g., an indication that the memory device 310 is operating according to a safe mode).

The memory device 310 may send the feedback to the host device 305 via path 395. In some cases, path 395 may include a distinct set of feedback pins or sideband pins (e.g., separate from memory pins 315). In some other cases, path 395 may include the memory pins 315. For example, the indication of the invalid command may be sent by the same path (e.g., including channel 320 and memory pins 315) as the host 305 uses to indicate commands to the memory device 310. When the memory device 310 sends the feedback to the host device via pins (e.g., via feedback pins, via memory pins 315), a first pin may indicate an invalid command while one or more other pins may transmit the received invalid command. In some other cases, the host device 305 may poll one or more of the event log registers 335. For example, the host device 305 may poll a register that indicates that the memory device 310 received an invalid command. In another example, the host device 305 may poll a register (e.g., a counting register) to determine a number of invalid commands that the memory device 310 has received within a time window.

The host device 305 may respond to the received feedback. In some cases, the host device 305 may determine to transmit one or more commands based on the feedback relating to the invalid command. For example, the feedback may indicate that the memory device 310 has entered into a safe mode of operation. Here, the host device 305 may transmit a command or commands as part of a reset procedure to transition the memory device 310 from the safe mode to the access mode. In another example, the host device 305 may determine that a desired command was not executed (e.g., due to the command not being defined at the memory device 310) and determine to re-transmit the same command, or transmit a different command or command sequence for execution. Additionally or alternatively, the host device 305 may transmit a command sequence to the memory device 310 to add a command to the set of defined commands. For example, the host device 305 may transmit a command sequence to add the desired command to the set of defined commands at the memory device 310.

In the case that the received command is defined at the memory device 305, the valid command circuitry may determine that a received command is included in the set of defined commands. Here, the valid command circuitry 325 may indicate via the pass/block signal 355 for the gate 345 to propagate the received command as internal command 365 to the decoder 360. The decoder 360 may receive the internal command 365 and determine an instruction and an address associated with the defined command. After decoding the command, the decoder 360 may subsequently indicate the instruction and the address to the memory array 370 (e.g., via the bus 375). The address sent to the memory array 370 may be, for example, a physical address of the memory array 370 including row, column, sub-array, bank, or bank group for the instruction (e.g., row matrix (MAT) and/or column MAT). In some cases, the mode registers 380 may further indicate a portion of the memory array associated with the safe mode of operation. In some other cases, the mode registers 380 may indicate a type of command that is restricted during the safe mode of operation.

The memory array 370 may determine a mode of operation for the memory device 310 by polling one or more mode registers 380. The mode registers 380 may indicate the mode of operation to the memory array 370 via bus 390. For example, the memory array 370 may read a value stored at the mode registers 380 to determine whether the memory device 310 is operating according to an access mode or a safe mode. Additionally or alternatively, the decoder 360 may poll the mode registers to determine the mode of operation for the memory device 310. Here, the decoder 360 may adjust the instruction and/or the address sent to the memory array 370 based on the determined mode of operation. For example, the decoder may not transmit, to the memory array 370, the instruction and address if the instruction and/or address are restricted as part of the safe mode of operation. Alternatively, the valid command circuitry 325 may poll the mode registers 380 to determine whether a received command is executable in light of a current mode of operation. Here, the valid command circuitry 325 may not propagate commands that are restricted as part of the safe mode of operation.

If the memory device 310 is operating according to an access mode, the memory array 370 may access the indicated address and according to the indicated instruction (e.g., an instruction corresponding to a read instruction, a refresh instruction, a write instruction). If the memory device 310 is operating according to a safe mode, the valid command circuitry 325, the decoder 360, or the memory array 310 may determine if the indicated address corresponds to a portion of the memory array 370 that is associated with a restriction of access. If the indicated address does correspond to the portion of the memory array 370 that is operating within the restricted access mode, the defined command may not be executed. If the indicated address does not correspond to the portion of the memory array 370 that is associated with a restriction of access, the defined command may be executed. Additionally or alternatively, if the memory device 310 is operating according to a safe mode, the memory array 310 may determine if the indicated instruction corresponds to an instruction restricted by the safe mode of operation. If the indicated instruction does correspond to a restricted instruction, the defined command may not be executed. If the indicated instruction does not correspond to a restricted instruction, the defined command may be executed.

Figure 4:
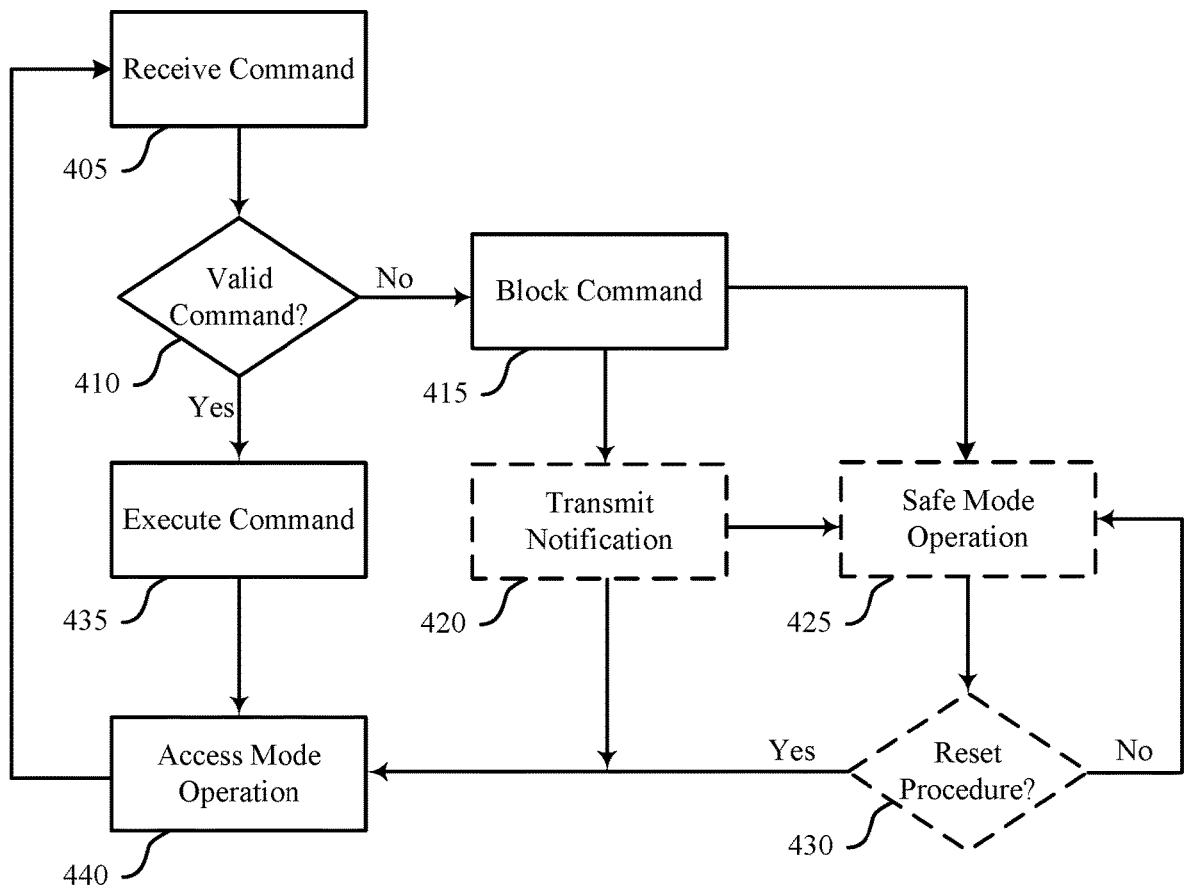
FIGS. 4 through 7 illustrate process flows that support command block management as disclosed herein.

FIG. 4 shows an example diagram of a process flow 400 that supports techniques for command block management. The features of process flow 400 may be implemented or performed by a memory device (e.g., the memory device 110, the memory dice 160, the memory die 200, or the memory device 310 described with reference to FIGS. 1 through 3) or a component of a memory device such as the device memory controller 155, the local memory controllers 165, the local memory controller 260, as described with reference to FIGS. 1 and 2.

At block 405, circuitry associated with a memory device may receive a command from a host device. The circuitry may correspond to, for example, portions of the memory device 310 such as the memory pins 315 and a corresponding input buffer, valid command circuitry 325, gate 345, decoder 360, or registers of FIG. 3. In some cases, the memory device may be operating according to an access mode at 405 (e.g., the memory device may execute each valid command received from a host device).

At block 410, the circuitry may determine whether the received command is valid. A valid command may correspond to a command included in a set of defined commands. The circuitry may compare the received command with the set of defined commands. In the case that the received command is included in the set of defined commands (e.g., the command is valid), the circuitry may proceed to block 435. At block 435, the circuitry may execute the command according to an instruction and address indicated by the command. Then, the circuitry may continue to operate in an access mode (e.g., at block 440). Alternatively, when the circuitry determines that the received command is absent from the set of defined commands at block 410 (e.g., the command is invalid), the circuitry may proceed to block 415.

At block 415, the circuitry may block the command. For example, the circuitry may prevent the command from being sent to a decoder (e.g., to be decoded into an instruction and an address and subsequently executed at a memory array associated with the memory device). In some cases, the circuitry may block the command by transmitting a block signal to a gate (e.g., as discussed with reference to FIG. 3). The block signal may act as a deactivation signal for the gate, or may set the gate to propagate a known command (e.g., NOP) to the decoder thus preventing the circuitry from transmitting the invalid command to a decoder. After the circuitry blocks the command, the circuitry may proceed to either block 420, 425, and/or 440.

At block 420, the circuitry may transmit a notification regarding the invalid command to a host device (e.g., host device 305 as discussed with reference to FIG. 3). The notification may include an indication that an invalid command was received (and subsequently blocked). In another example, the notification may include the received command that was blocked. Additionally or alternatively, the notification may include an indication that a threshold was satisfied. The threshold may correspond to a number of invalid commands (e.g., received within a configured time window) that may be indicative of a malicious attack. Therefore, the notification may indicate that the threshold has been met (e.g., the number of invalid commands received during the configured time window satisfied the threshold). In some other cases, the notification may include the mode of operation of the memory device (e.g., an access mode, a safe mode) or a restriction associated with the mode of operation (e.g., a bank or sub-array that is restricted). After the circuitry transmits the notification to the host device, the circuitry may proceed to either block 440 (e.g., operating according to the access mode operation) or to block 425.

At 425, the circuitry may optionally transition the memory device from an access mode to a safe mode operation. In some cases, the circuitry may transition the memory device to a safe mode operation in the event that the circuitry detects that the threshold number of invalid commands has been met. That is, the circuitry may detect a potentially malicious attack to the memory device and may switch to a safe mode operation to restrict the operation of the memory device (e.g., limit the instructions to certain types of command, limit the portion/banks of a memory array for executing commands). After the circuitry transitions the memory device to a safe mode operation, the circuitry may proceed to block 430.

At block 430, the circuitry may identify whether a reset procedure has been executed. The reset procedure may be specific to the portions of the memory array that have been transitioned to a safe mode operation. A reset procedure may transition the memory array (or portions of the memory array) from the safe mode to the access mode. When the circuitry determines that the reset procedure has been executed, the circuitry may proceed to block 440, where the circuitry may transition the memory device (or portions of the memory device that had been operating according to the safe mode) into the access mode. Alternatively, when the circuitry determines that the reset procedure has not been executed, the circuitry may proceed to block 425 (e.g., the circuitry may continue to block certain types of access commands or the portion(s) of the memory array that are operating according to a safe mode).

Figure 5:
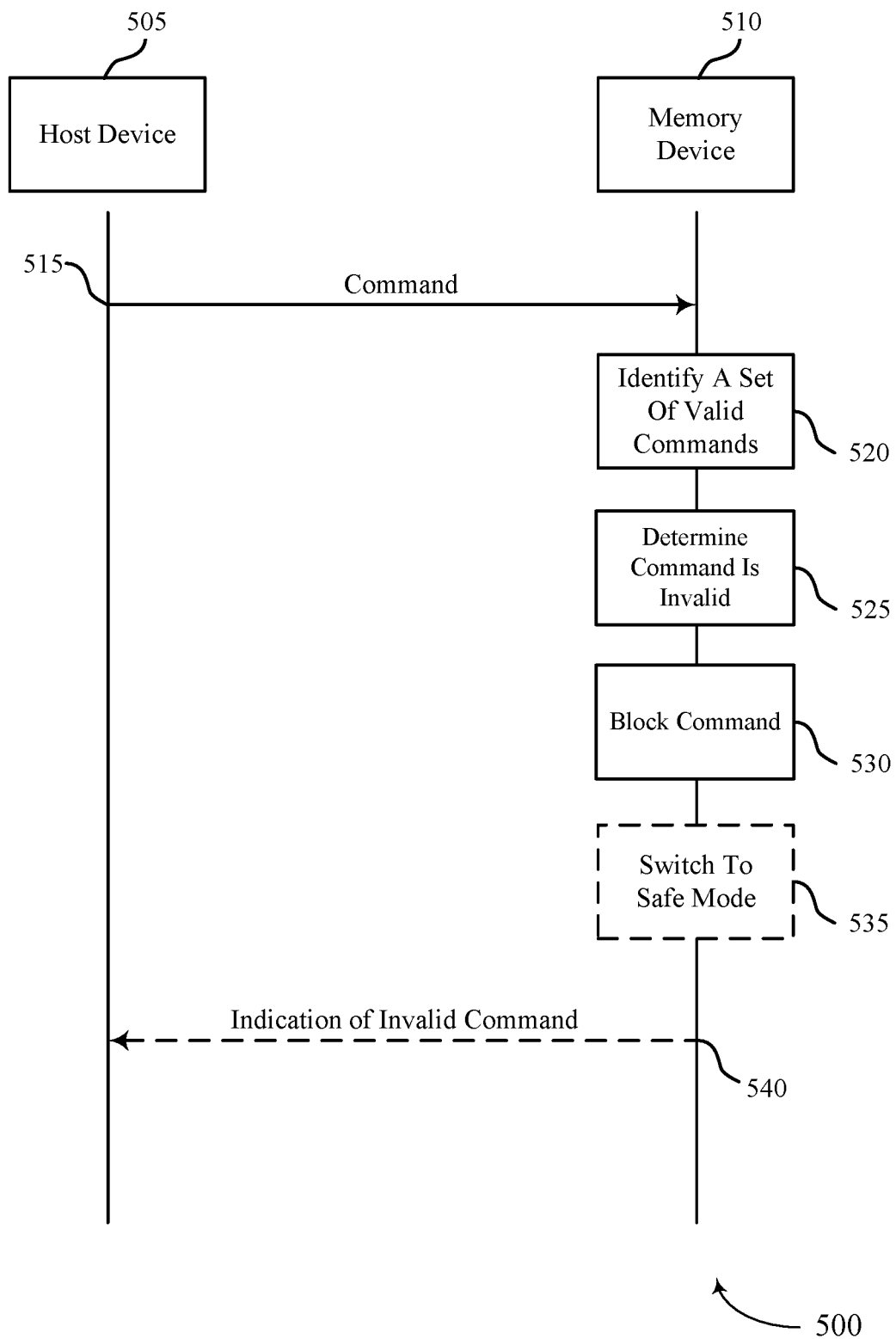

FIG. 5 illustrates an example of a process flow 500 that supports techniques for command block management. In some examples, process flow 500 may be implemented by aspects of the systems 100 and 300, memory die 200, and process flow 400. The process flow 500 may include operations performed by a host device 505, which may be an example of the host device described with reference to FIGS. 1, 3, and 4. The memory device 510 may be an example of a memory device (e.g., the memory device 110, the memory dice 160, the memory die 200, or the memory device 310) as described with reference to FIGS. 1 through 4.

At 515, the memory device 510, comprising a memory array, may receive a command from the host device 505. In some cases, the command may include an instruction and an address.

At 520, the memory device 510 may identify a set of valid commands for the memory device 510. In some cases, the set of valid commands may be preconfigured in the memory device 510. In some other cases, the set of valid commands may be programmable. Here, the memory device 510 may receive, from the host device 505, a signal indicating the set of valid commands.

At 525, the memory device 510 may determine that the command (e.g., received at 515) is absent from the set of valid commands (e.g., the command is invalid). In some cases, the memory device 510 may determine the validity of the command by comparing the command to a set of valid commands.

At 530, the memory device 510 may block, based at least in part on determining that the command is absent from the set of valid commands, the command from being decoded for execution by the memory device.

At 535, the memory device 510 may optionally switch from an access mode of operation (e.g., a first mode of operation) of the memory device 510 to a safe mode of operation (e.g., a second mode of operation) of the memory device 510 based at least in part on determining that the command is absent from the set of valid commands. In some cases, the memory device 510 may restrict access to at least one address of the memory array based at least in part on switching to the safe mode of operation. In some cases, the memory device 510 may operate at least one bank of the memory in a self-refresh mode based at least in part on switching to the safe mode of operation. Additionally or alternatively, the memory device 510 may restrict the execution for at least one command of the set of valid commands based at least in part on switching to the safe mode of operation (e.g., the execution of write commands may be restricted).

In the case that memory device switches to operating according to a safe mode at 535, the memory device may subsequently receive, from the host device 505 while operating in the safe mode, a command sequence for resetting the memory device 510 to the access mode (not shown). The memory device 510 may switch from the safe mode to the access mode based at least in part on receiving the command sequence.

At 540, the memory device 510 may optionally transmit, to the host device 505, an indication that the command is absent from the set of valid commands (e.g., indicate that the command is invalid). In some cases, the memory device 510 may transmit the indication based at least in part on a quantity of commands determined to be invalid satisfying a threshold. The memory device 510 may determine the threshold based on receiving a signal indicating the threshold from the host device 505.

Figure 6:
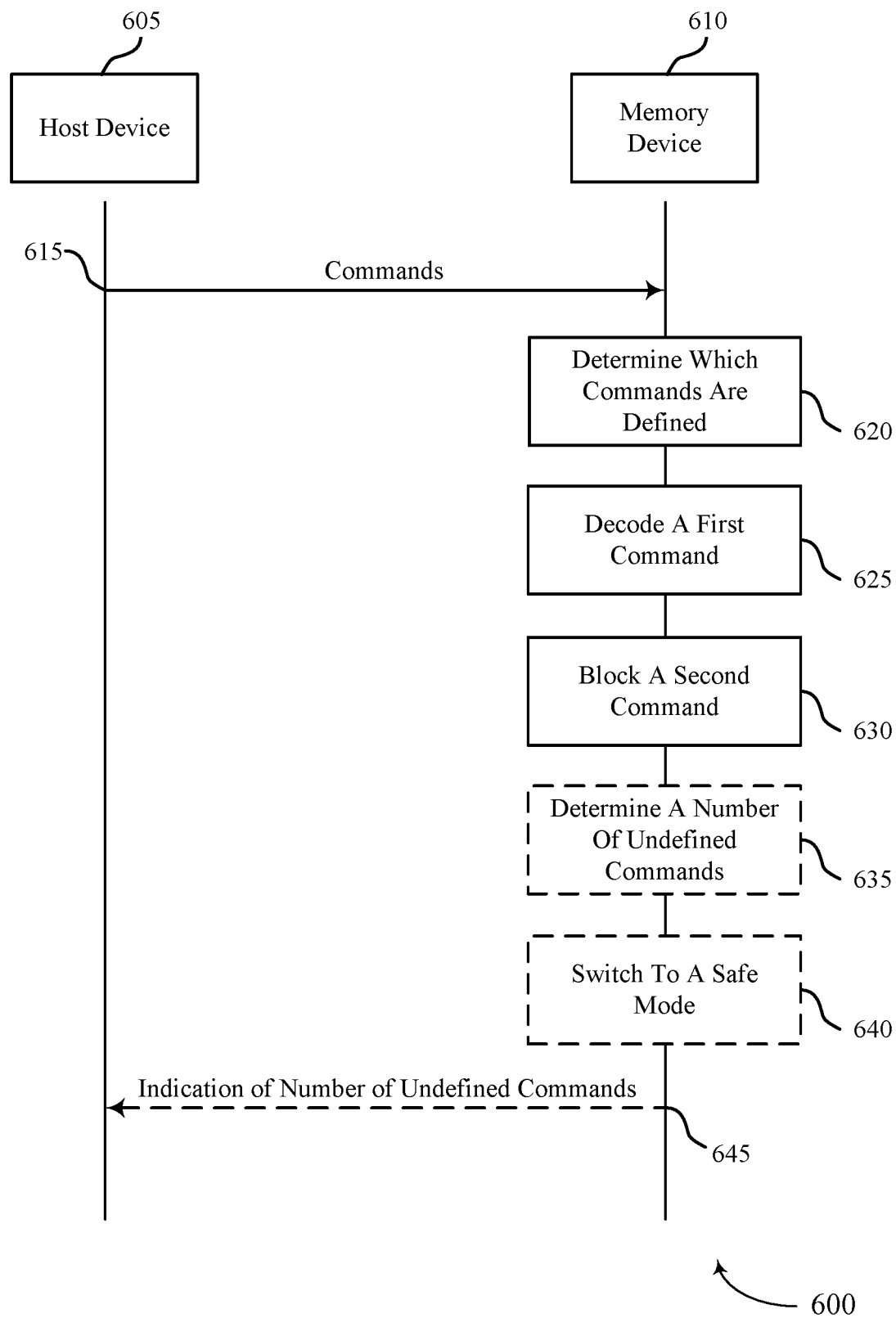

FIG. 6 illustrates an example of a process flow 600 that supports techniques for command block management. In some examples, process flow 600 may be implemented by aspects of the systems 100 and 300, memory die 200, and process flows 400 and 500. The process flow 600 may include operations performed by a host device 605, which may be an example of the host device described with reference to FIGS. 1, 3, 4, and 5. The process flow 600 may include operations performed by a memory device 610, which may be an example of a memory device (e.g., the memory device 110, the memory dice 160, the memory die 200, the memory device 310, or the memory device 510) as described with reference to FIGS. 1 through 5.

At 615, the memory device 610 may receive a plurality of commands (e.g., in contiguous or non-contiguous clock cycles) from a host device 605. Each of the plurality of commands may include an instruction and/or address (e.g., row address, column address).

At 620, the memory device 610 may determine whether each command of the plurality of commands is included in a set of defined commands. In some cases, the memory device 610 may store the set of defined commands at the memory device 610. Here, the memory device 610 may determine whether each command is included in the set of defined commands by comparing each of the plurality of commands to the stored set of defined commands.

At 625, the memory device 610 may decode a first command of the plurality of commands for execution on a memory array of the memory device 610 based at least in part on determining that the first command is included in the set of defined commands (e.g., the first command may be defined).

At 630, the memory device 610 may block a second command of the plurality of commands from being decoded for execution on the memory array based at least in part on determining that the second command is absent from the set of defined commands (e.g., the command may be undefined).

At 635, the memory device 610 may, in some cases, determine a quantity of commands of the plurality of commands that are absent from the set of defined commands. That is, the memory device 610 may determine a number of commands that are undefined. In some cases, the memory device 610 may compare the quantity to a threshold. In some examples, the memory device 610 may store one or more commands of the plurality of commands based at least in part on determining that the one or more commands are absent from the set of defined commands.

At 640, the memory device 610 may switch from a first mode of operation (e.g., an access mode) of the memory device 610 to a second mode of operation (e.g., a safe mode) of the memory device 610 based on determining that the quantity satisfies the threshold. That is, the memory device 610 may switch to a safe mode in the event that a number of undefined commands satisfies the threshold. In some cases, the memory device 610 may determine the threshold by receiving, from the host device 605, a signal indicating the threshold.

At 645, the memory device 610 may transmit, to the host device 605, an indication that the quantity satisfies the threshold.

Figure 7:
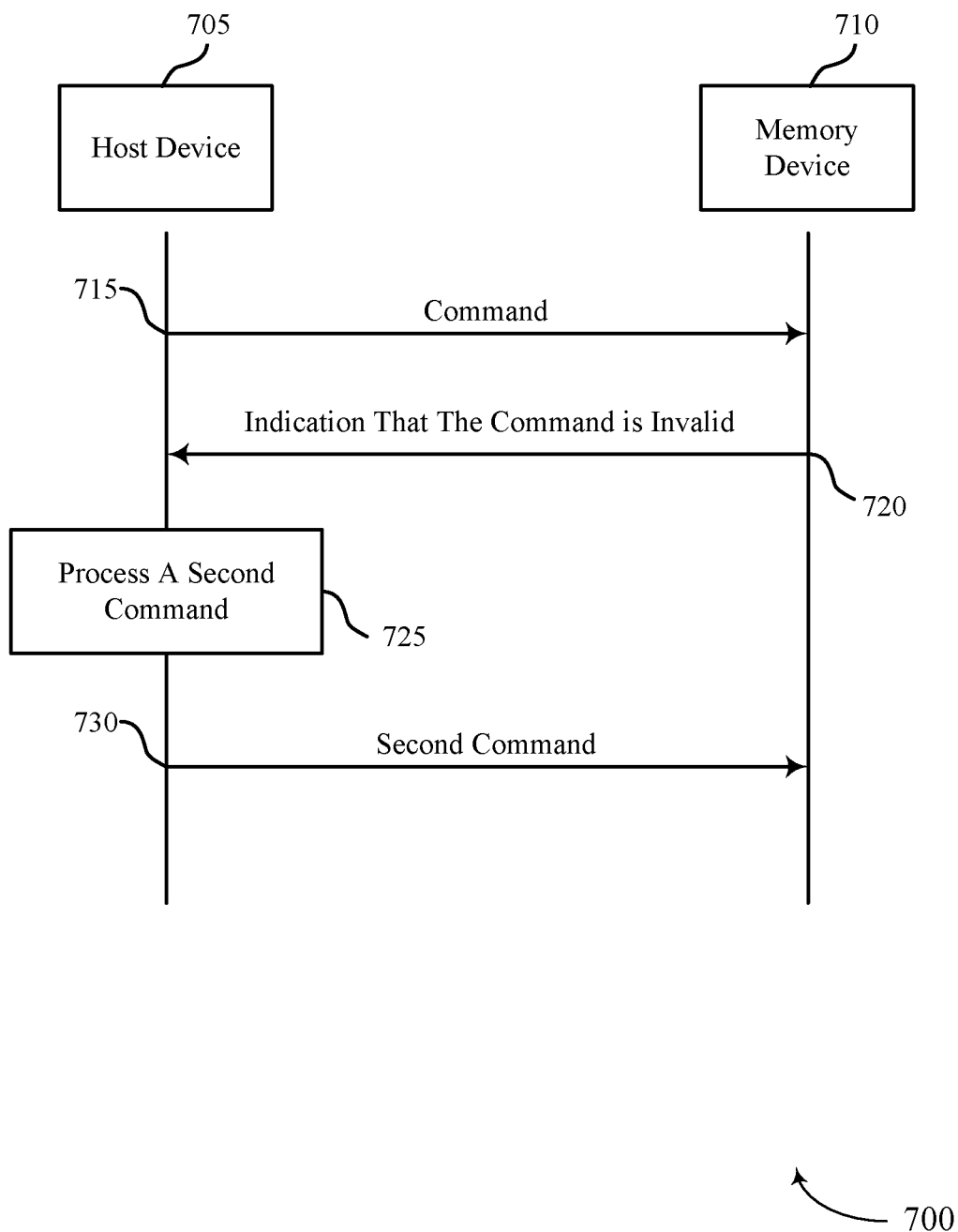

FIG. 7 illustrates an example of a process flow 700 that supports techniques for command block management. In some examples, process flow 700 may be implemented by aspects of the systems 100 and 300, memory die 200, and process flows 400, 500, and 600. The process flow 700 may include operations performed by a host device 705, which may be an example of the host device described with reference to FIGS. 1, 3, 4, 5, and 6. The process flow 700 may include operations performed by a memory device 710, which may be an example of a memory device (e.g., the memory device 110, the memory dice 160, the memory die 200, the memory device 310, the memory device 510, or the memory device 610) as described with reference to FIGS. 1 through 6.

At 715, the host device 705 may transmit, to the memory device 710, a command for an operation on a memory array of the memory device 710. The command may include an instruction and/or address (e.g., row address, column address).

At 720, the host device 705 may receive, from the memory device 710 in response to the command, an indication that the command as received at the memory device 710 is absent from a set of valid commands for the memory device 710 (e.g., the command is invalid for the memory device 710). In some cases, the indication may further include an indication that the memory device 710 may have switched from a first mode of operation (e.g., an access mode of operation) to a second mode of operation (e.g., a safe mode of operation) based on the command.

At 725, the host device 705 may process a second command from the memory device based on the indication. In some cases, processing a second command may include the host device 705 modifying commands that are waiting to be sent to the memory device 710. For example, the host device 705 may change commands that are indicated as invalid by the memory device 710. In another example, the host device 705 may modify commands that may not be executed by the memory device 710 according to the second mode of operation. In another case, processing a second command may include the host device 705 determining to retransmit the first command.

At 730, the host device 705 may transmit, to the memory device 710, a second command. In some cases, the second command may be part of a command sequence. In a first example, memory device 710 may be operating in a second mode (e.g., a safe mode as indicated at 720). Here, the host device 705 may transmit, to the memory device 710 while the memory device 710 is operating in the second mode, a command sequence for resetting the memory device 710 to the first mode. In a second example, the host device 705 may transmit, to the memory device 710, a command sequence for adding the command to the set valid commands. In a third example, the host device 705 may transmit, to the memory device 710, a request for a representation of the command as received by the memory device 710. Here, the host device 705 may receive, from the memory device 710, an indication of the representation of the command.

Figure 8:
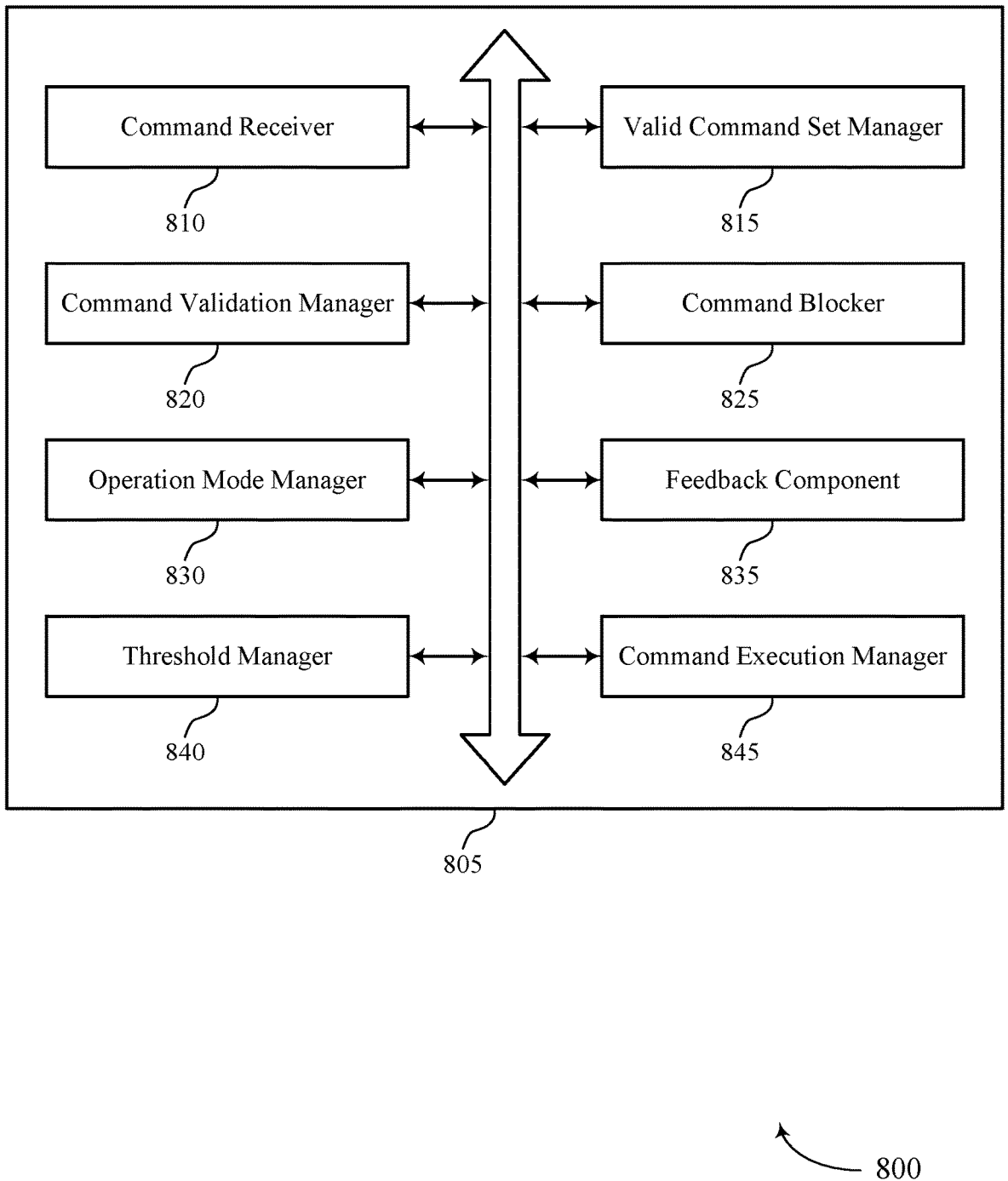
FIGS. 8 and 9 illustrate block diagrams for apparatuses that support command block management as disclosed herein.

FIG. 8 shows a block diagram 800 of a device 805 that supports command block management as disclosed herein. The device 805 may be an example of aspects of a memory device such as memory device 110, memory device 310, memory device 510, memory device 610, or memory device 710 as disclosed herein with reference to FIGS. 1, 3, 5, 6, and 7. The device 805 may include command receiver 810, a valid command set manager 815, a command validation manager 820, a command blocker 825, an operation mode manager 830, a feedback component 835, a threshold manager 840, and a command execution manager 845. Each of these modules may communicate, directly or indirectly, with one another (e.g., via one or more buses).

The command receiver 810 may receive, at a memory device including a memory array, a command from a host device. In some cases, the command includes an instruction and an address.

The valid command set manager 815 may identify a set of valid commands for the memory device. In some examples, the valid command set manager 815 may receive, from the host device, a signal indicating the set of valid commands. In some other examples, the set of valid commands is preconfigured in the memory device.

The command validation manager 820 may determine that the command is absent from the set of valid commands based on evaluating the command and the set of valid commands.

The command blocker 825 may block, based on determining that the command is absent from the set of valid commands, the command from being decoded for execution by the memory device.

The operation mode manager 830 may switch from a first mode of operation of the memory device to a second mode of operation of the memory device based on determining that the command is absent from the set of valid commands. In some examples, the operation mode manager 830 may restrict access to at least one address of the memory array based on switching to the second mode of operation. In some examples, the operation mode manager 830 may operate at least one bank of the memory array in a self-refresh mode based on switching to the second mode of operation. In some other examples, the operation mode manager 830 may restrict execution for at least one command of the set of valid commands based on switching to the second mode of operation. In some examples, the operation mode manager 830 may receive, from the host device while operating in the second mode, a command sequence for resetting the memory device to the first mode. In some examples, the operation mode manager 830 may switch the memory device from the second mode to the first mode based on receiving the command sequence.

In some examples, the feedback component 835 may transmit, to the host device, an indication that the command is absent from the set of valid commands.

The command receiver 810 may receive, from a host device at a memory device including a memory array, a command for an operation by the memory device. The command validation manager 820 may determine a validity of the command by comparing the command to a set of valid commands.

The feedback component 835 may transmit, to the host device, an indication of the validity of the command. In some examples, the feedback component 835 may transmit the indication based on a quantity of commands determined to be invalid satisfying a threshold. In some cases, the threshold manager 840 may receive a signal indicating the threshold from the host device.

The command receiver 810 may receive, at a memory device, a set of commands from a host device.

The command validation manager 820 may determine whether each command of the set of commands is included in a set of defined commands. In some cases, the command validation manager 820 may store one or more commands of the set of commands based on determining that the one or more commands are absent from the set of defined commands. In some examples, the command validation manager 820 may store the set of defined commands at the memory device. In some examples, the command validation manager 820 may determine a quantity of commands of the set of commands that are absent from the set of defined commands.

The threshold manager 840 may receive, from the host device, a signal indicating the threshold. In some examples, the threshold manager 840 may compare the quantity to a threshold.

The operation mode manager 830 may switch from a first mode of operation of the memory device to a second mode of operation of the memory device based on determining that the quantity satisfies the threshold.

The feedback component 835 may transmit, to the host device, an indication that the quantity satisfies the threshold. In some examples, the feedback component 835 may transmit, to the host device, an indication of the one or more commands (e.g., the one or more commands stored based on determining that the one or more commands are absent from the set of defined commands).

The command execution manager 845 may decode a first command of the set of commands for execution on a memory array of the memory device based on determining that the first command is included in the set of defined commands.

The command blocker 825 may block a second command of the set of commands from being decoded for execution on the memory array based on determining that the second command is absent from the set of defined commands.

Figure 9:
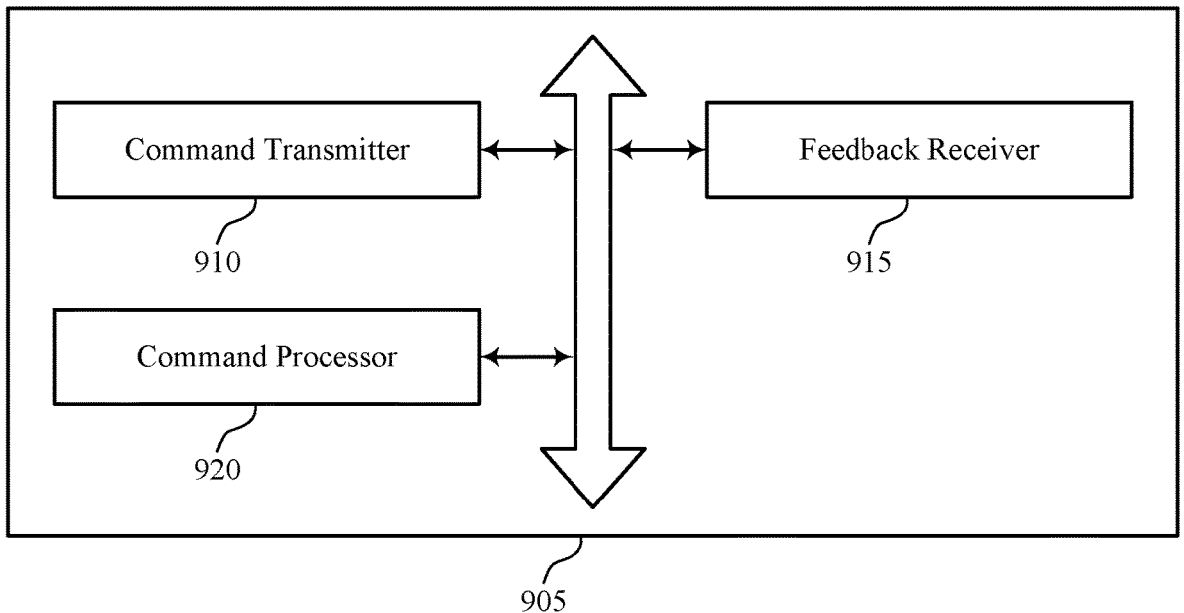

FIG. 9 shows a block diagram 900 of a device 905 that supports command block management as disclosed herein. The device 905 may be an example of aspects of a host device such as host device 305, host device 505, host device 605, or host device 705 as disclosed herein with reference to FIGS. 3 and 5 through 7. The device 905 may include a command transmitter 910, a feedback receiver 915, and a command processor 920. Each of these modules may communicate, directly or indirectly, with one another (e.g., via one or more buses).

The command transmitter 910 may transmit, to a memory device, a command for an operation on a memory array of the memory device. In some examples, the command transmitter 910 may transmit, to the memory device, the second command. In some examples, the command transmitter 910 may transmit, to the memory device while the memory device is operating in the second mode, a command sequence for resetting the memory device to the first mode. In some cases, the command transmitter 910 may transmit, to the memory device, a command sequence that includes the second command, the command sequence for adding the command to the set of valid commands. In some instances, the command transmitter 910 may transmit, to the memory device, a request for a representation of the command as received by the memory device.

The feedback receiver 915 may receive, from the memory device in response to the command, an indication that the command as received at the memory device is absent from a set of valid commands for the memory device. In some examples, the feedback receiver 915 may receive, from the memory device, an indication that the memory device has switched from a first mode of operation to a second mode of operation based on the command. In some instances, the feedback receiver 915 may receive, from the memory device, an indication of the representation of the command.

The command processor 920 may process a second command for the memory device based on the indication.

Figure 10:
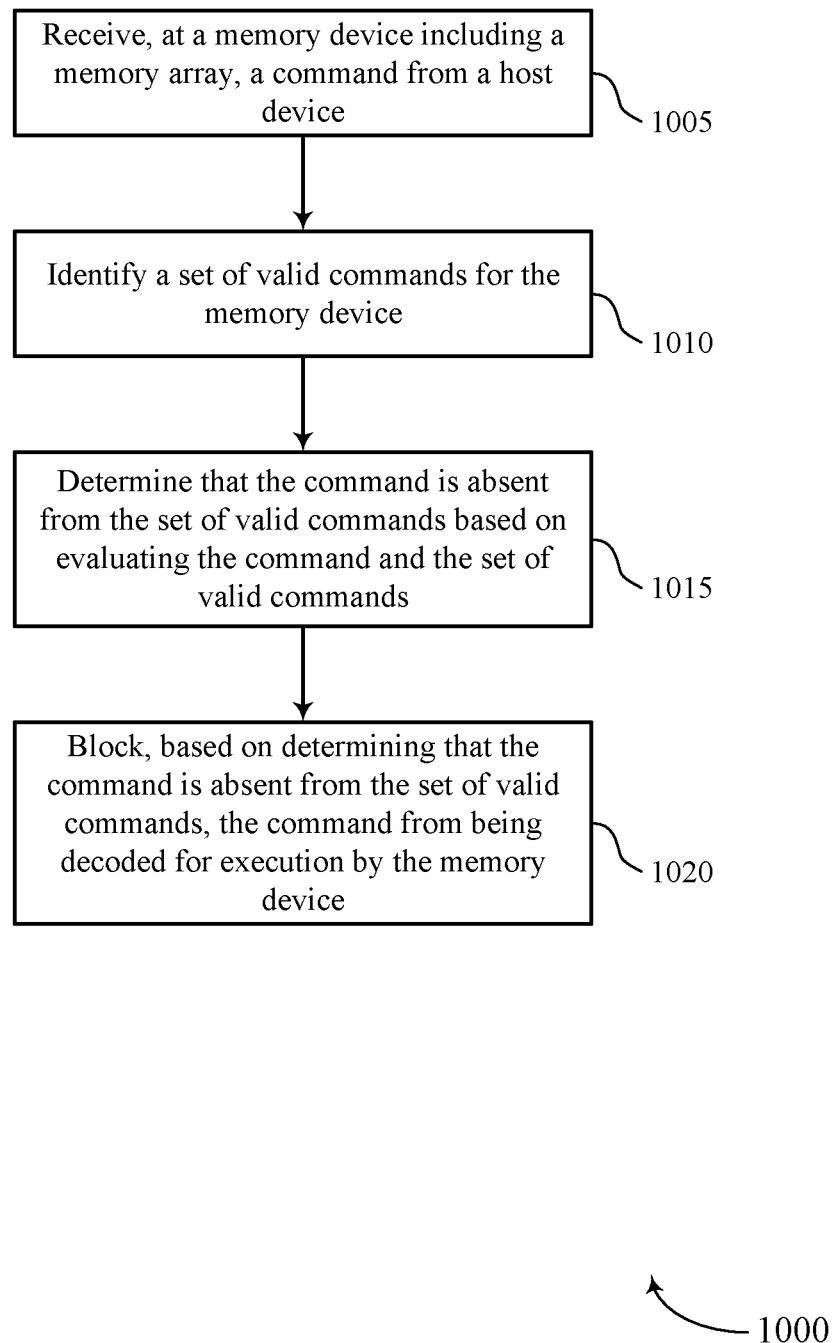
FIGS. 10 through 14 illustrate a method or methods that support memory command verification as disclosed herein.

FIG. 10 shows a flowchart illustrating a method 1000 that supports systems, devices, and methods for command block management as disclosed herein. The operations of method 1000 may be implemented by a memory device (e.g., memory device 110, memory device 310, memory device 510, memory device 610, or memory device 710 as disclosed herein with reference to FIGS. 1, 3, 5, 6, and 7) or its components as described herein. In some examples, a memory device may execute a set of instructions to control the functional elements of the memory device to perform the functions described herein. Additionally or alternatively, a memory device may perform aspects of the functions described below using special-purpose hardware.

At 1005, the memory device may receive, at a memory device including a memory array, a command from a host device. The operations of 1005 may be performed according to the methods described herein. In some examples, aspects of the operations of 1005 may be performed by a command receiver as described with reference to FIG. 8.

At 1010, the memory device may identify a set of valid commands for the memory device. The operations of 1010 may be performed according to the methods described herein. In some examples, aspects of the operations of 1010 may be performed by a valid command set manager as described with reference to FIG. 8.

At 1015, the memory device may determine that the command is absent from the set of valid commands based on evaluating the command and the set of valid commands. The operations of 1015 may be performed according to the methods described herein. In some examples, aspects of the operations of 1015 may be performed by a command validation manager as described with reference to FIG. 8.

At 1020, the memory device may block, based on determining that the command is absent from the set of valid commands, the command from being decoded for execution by the memory device. The operations of 1020 may be performed according to the methods described herein. In some examples, aspects of the operations of 1020 may be performed by a command blocker as described with reference to FIG. 8.

An apparatus for performing a method or methods, such as the method 1000, is described. The apparatus may include means for means for receiving, at a memory device including a memory array, a command from a host device, identifying a set of valid commands for the memory device, determining that the command is absent from the set of valid commands based on evaluating the command and the set of valid commands, and blocking, based on determining that the command is absent from the set of valid commands, the command from being decoded for execution by the memory device.

In some examples, the apparatus may include features for switching from a first mode of operation of the memory device to a second mode of operation of the memory device based on determining that the command may be absent from the set of valid commands.

In some cases, the apparatus may include features for restricting access to at least one address of the memory array based on switching to the second mode of operation.

In some instances, the apparatus may include features for operating at least one bank of the memory array in a self-refresh mode based on switching to the second mode of operation.

In some examples, the apparatus may include features for restricting execution for at least one command of the set of valid commands based on switching to the second mode of operation.

In some cases, the apparatus may include features for receiving, from the host device while operating in the second mode, a command sequence for resetting the memory device to the first mode, and switching the memory device from the second mode to the first mode based on receiving the command sequence.

In some instances, the apparatus may include features for transmitting, to the host device, an indication that the command may be absent from the set of valid commands.

In some examples, the apparatus may include features for receiving, from the host device, a signal indicating the set of valid commands.

Figure 11:
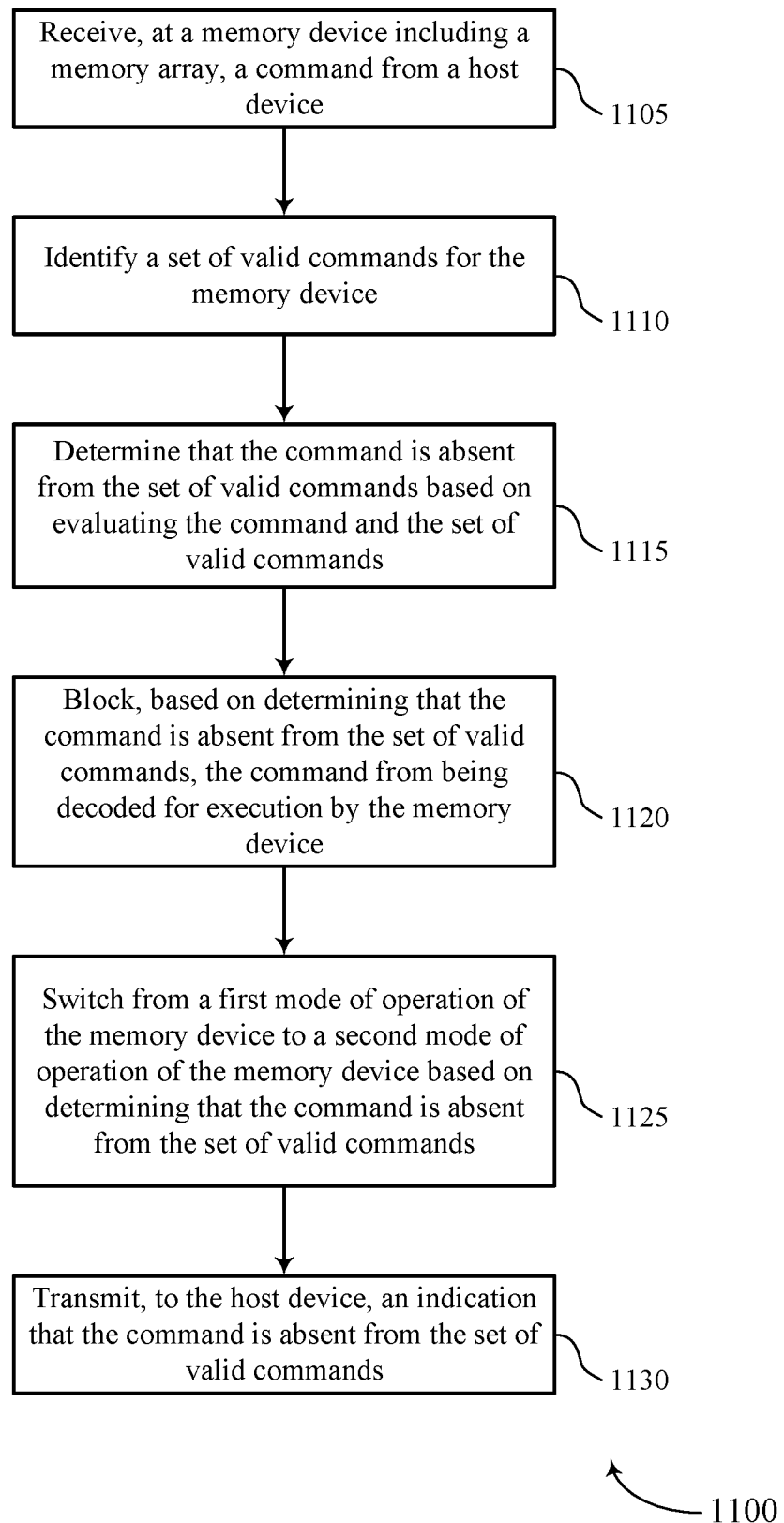

FIG. 11 shows a flowchart illustrating a method 1100 that supports systems, devices, and methods for command block management as disclosed herein. The operations of method 1100 may be implemented by a memory device (e.g., memory device 110, memory device 310, memory device 510, memory device 610, or memory device 710 as disclosed herein with reference to FIGS. 1, 3, 5, 6, and 7) or its components as described herein. In some examples, a memory device may execute a set of instructions to control the functional elements of the memory device to perform the functions described herein. Additionally or alternatively, a memory device may perform aspects of the functions described herein using special-purpose hardware.

At 1105, the memory device including a memory array may receive a command from a host device. The operations of 1105 may be performed according to the methods described herein. In some examples, aspects of the operations of 1105 may be performed by a command receiver as described with reference to FIG. 8.

At 1110, the memory device may identify a set of valid commands for the memory device. The operations of 1110 may be performed according to the methods described herein. In some examples, aspects of the operations of 1110 may be performed by a valid command set manager as described with reference to FIG. 8.

At 1115, the memory device may determine that the command is absent from the set of valid commands based on evaluating the command and the set of valid commands. The operations of 1115 may be performed according to the methods described herein. In some examples, aspects of the operations of 1115 may be performed by a command validation manager as described with reference to FIG. 8.

At 1120, the memory device may block, based on determining that the command is absent from the set of valid commands, the command from being decoded for execution by the memory device. The operations of 1120 may be performed according to the methods described herein. In some examples, aspects of the operations of 1120 may be performed by a command blocker as described with reference to FIG. 8.

At 1125, the memory device may switch from a first mode of operation of the memory device to a second mode of operation of the memory device based on determining that the command is absent from the set of valid commands. The operations of 1125 may be performed according to the methods described herein. In some examples, aspects of the operations of 1125 may be performed by an operation mode manager as described with reference to FIG. 8.

At 1130, the memory device may transmit, to the host device, an indication that the command is absent from the set of valid commands. The operations of 1130 may be performed according to the methods described herein. In some examples, aspects of the operations of 1130 may be performed by a feedback component as described with reference to FIG. 8.

Figure 12:
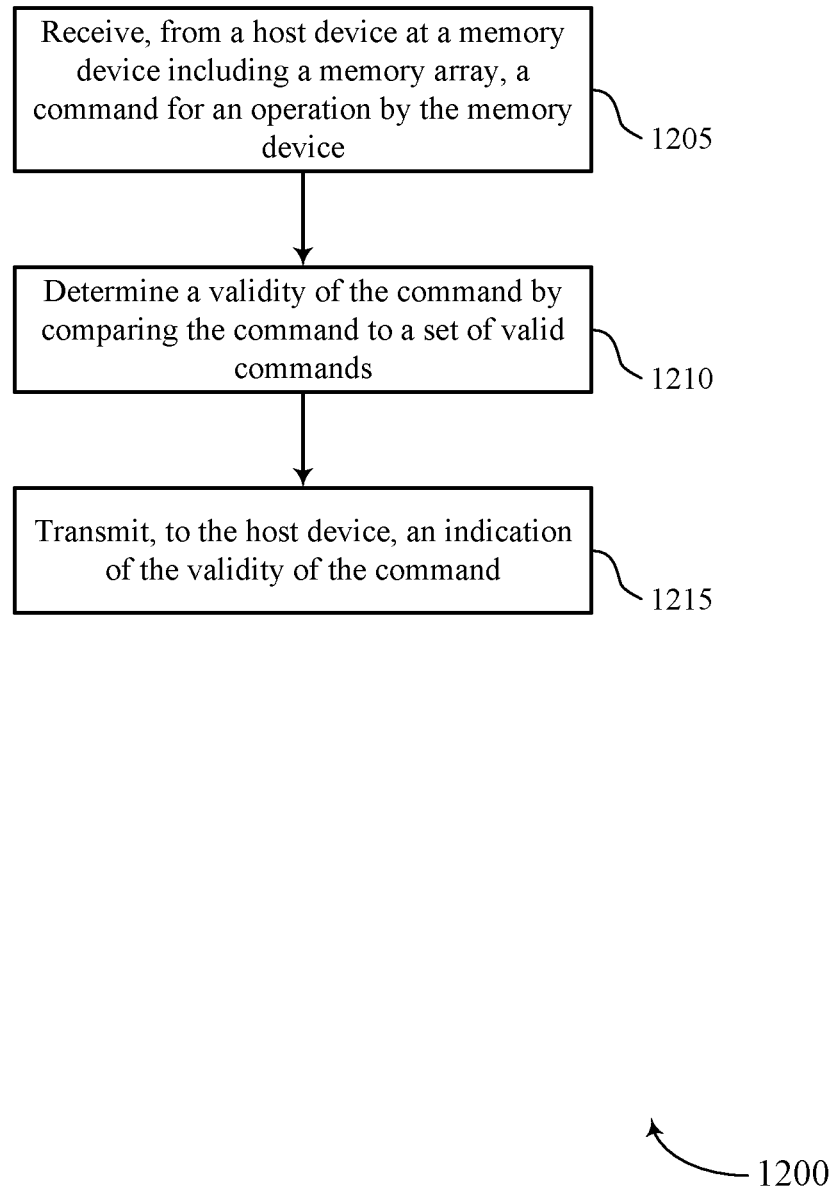

FIG. 12 shows a flowchart illustrating a method 1200 that supports systems, devices, and methods for command block management as disclosed herein. The operations of method 1200 may be implemented by a memory device (e.g., memory device 110, memory device 310, memory device 510, memory device 610, or memory device 710 as disclosed herein with reference to FIGS. 1, 3, 5, 6, and 7) or its components as described herein. In some examples, a memory device may execute a set of instructions to control the functional elements of the memory device to perform the functions described herein. Additionally or alternatively, a memory device may perform aspects of the functions described herein using special-purpose hardware.

At 1205, the memory device may receive, from a host device at a memory device including a memory array, a command for an operation by the memory device. The operations of 1205 may be performed according to the methods described herein. In some examples, aspects of the operations of 1205 may be performed by a command receiver as described with reference to FIG. 8.

At 1210, the memory device may determine a validity of the command by comparing the command to a set of valid commands. The operations of 1210 may be performed according to the methods described herein. In some examples, aspects of the operations of 1210 may be performed by a command validation manager as described with reference to FIG. 8.

At 1215, the memory device may transmit, to the host device, an indication of the validity of the command. The operations of 1215 may be performed according to the methods described herein. In some examples, aspects of the operations of 1215 may be performed by a feedback component as described with reference to FIG. 8.

An apparatus for performing a method or methods, such as the method 1200, is described. The apparatus may include means for receiving, from a host device at a memory device including a memory array, a command for an operation by the memory device, determining a validity of the command by comparing the command to a set of valid commands, and transmitting, to the host device, an indication of the validity of the command.

In some examples, the apparatus may include features for transmitting the indication based on a quantity of commands determined to be invalid satisfying a threshold.

In some cases, the apparatus may include features for receiving a signal indicating the threshold from the host device.

Figure 13:
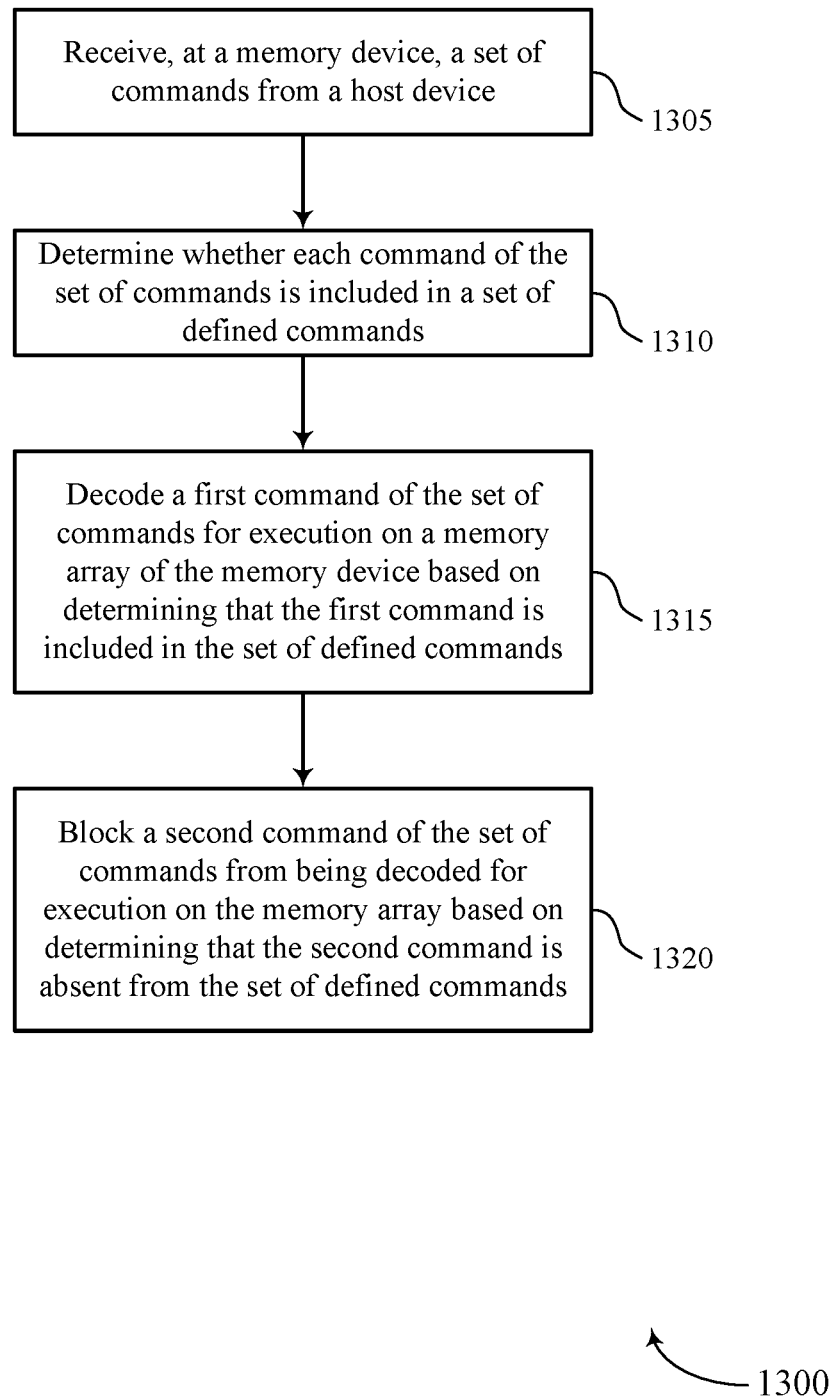

FIG. 13 shows a flowchart illustrating a method 1300 that supports systems, devices, and methods for command block management as disclosed herein. The operations of method 1300 may be implemented by a memory device (e.g., memory device 110, memory device 310, memory device 510, memory device 610, or memory device 710 as disclosed herein with reference to FIGS. 1, 3, 5, 6, and 7) or its components as described herein. In some examples, a memory device may execute a set of instructions to control the functional elements of the memory device to perform the functions described herein. Additionally or alternatively, a memory device may perform aspects of the functions described herein using special-purpose hardware.

At 1305, the memory device may receive, at a memory device, a set of commands from a host device. The operations of 1305 may be performed according to the methods described herein. In some examples, aspects of the operations of 1305 may be performed by a command receiver as described with reference to FIG. 8.

At 1310, the memory device may determine whether each command of the set of commands is included in a set of defined commands. The operations of 1310 may be performed according to the methods described herein. In some examples, aspects of the operations of 1310 may be performed by a command validation manager as described with reference to FIG. 8.

At 1315, the memory device may decode a first command of the set of commands for execution on a memory array of the memory device based on determining that the first command is included in the set of defined commands. The operations of 1315 may be performed according to the methods described herein. In some examples, aspects of the operations of 1315 may be performed by a command execution manager as described with reference to FIG. 8.

At 1320, the memory device may block a second command of the set of commands from being decoded for execution on the memory array based on determining that the second command is absent from the set of defined commands. The operations of 1320 may be performed according to the methods described herein. In some examples, aspects of the operations of 1320 may be performed by a command blocker as described with reference to FIG. 8.

An apparatus for performing a method or methods, such as the method 1300, is described. The apparatus may include means for receiving, at a memory device, a set of commands from a host device, determining whether each command of the set of commands is included in a set of defined commands, decoding a first command of the set of commands for execution on a memory array of the memory device based on determining that the first command is included in the set of defined commands, and blocking a second command of the set of commands from being decoded for execution on the memory array based on determining that the second command is absent from the set of defined commands.

In some examples, the apparatus may include features for determining a quantity of commands of the set of commands that may be absent from the set of defined commands, and comparing the quantity to a threshold.

In some cases, the apparatus may include features for switching from a first mode of operation of the memory device to a second mode of operation of the memory device based on determining that the quantity satisfies the threshold.

In some instances, the apparatus may include features for transmitting, to the host device, an indication that the quantity satisfies the threshold.

In some examples, the apparatus may include features for storing one or more commands of the set of commands based on determining that the one or more commands may be absent from the set of defined commands, and transmitting, to the host device, an indication of the one or more commands.

In some aspects, the apparatus may include features for receiving, from the host device, a signal indicating the threshold.

In some cases, the apparatus may include features for storing the set of defined commands at the memory device.

Figure 14:
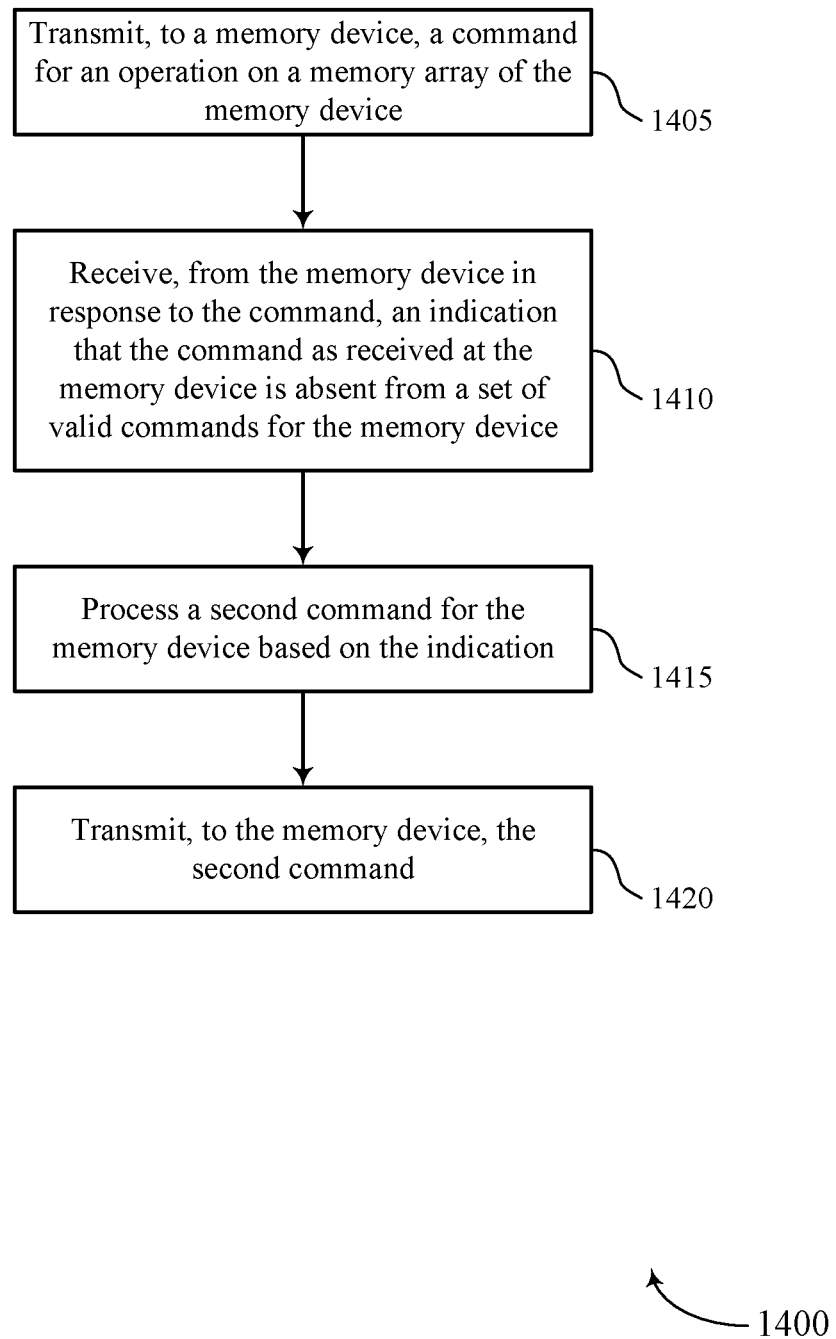

FIG. 14 shows a flowchart illustrating a method 1400 that supports command block management as disclosed herein. The operations of method 1400 may be implemented may be implemented by a host device (e.g., host device 305, host device 505, host device 605, or host device 705 as disclosed herein with reference to FIGS. 3 and 5 through 7) or its components as described herein. In some examples, a host device may execute a set of instructions to control the functional elements of the host device to perform the functions described herein. Additionally or alternatively, a host device may perform aspects of the functions described herein using special-purpose hardware.

At 1405, the host device may transmit, to a memory device, a command for an operation on a memory array of the memory device. The operations of 1405 may be performed according to the methods described herein. In some examples, aspects of the operations of 1405 may be performed by a command transmitter as described with reference to FIG. 9.

At 1410, the host device may receive, from the memory device in response to the command, an indication that the command as received at the memory device is absent from a set of valid commands for the memory device. The operations of 1410 may be performed according to the methods described herein. In some examples, aspects of the operations of 1410 may be performed by a feedback receiver as described with reference to FIG. 9.

At 1415, the host device may process a second command for the memory device based on the indication. The operations of 1415 may be performed according to the methods described herein. In some examples, aspects of the operations of 1415 may be performed by a command processor as described with reference to FIG. 9.

At 1420, the host device may transmit, to the memory device, the second command. The operations of 1420 may be performed according to the methods described herein. In some examples, aspects of the operations of 1420 may be performed by a command transmitter as described with reference to FIG. 9.

An apparatus for performing a method or methods, such as the method 1400, is described. The apparatus may include means for transmitting, to a memory device, a command for an operation on a memory array of the memory device, receiving, from the memory device in response to the command, an indication that the command as received at the memory device is absent from a set of valid commands for the memory device, processing a second command for the memory device based on the indication, and transmitting, to the memory device, the second command.

In some examples, the apparatus may include features for receiving, from the memory device, an indication that the memory device may have switched from a first mode of operation to a second mode of operation based on the command.

In some cases, the apparatus may include features for transmitting, to the memory device while the memory device may be operating in the second mode, a command sequence for resetting the memory device to the first mode.

In some instances, the apparatus may include features for transmitting, to the memory device, a command sequence that includes the second command, the command sequence for adding the command to the set of valid commands.

In some examples, the apparatus may include features for transmitting, to the memory device, a request for a representation of the command as received by the memory device, and receiving, from the memory device, an indication of the representation of the command.

It should be noted that the methods described above describe possible implementations, and that the operations and the steps may be rearranged or otherwise modified and that other implementations are possible. Further, aspects from two or more of the methods may be combined.

In some examples, an apparatus for command block management may perform aspects of the functions described herein using general- or special-purpose hardware. The apparatus may include a memory array of a memory device, circuitry operable to receive a set of commands from a host device, a decoder coupled with the circuitry and the memory array and operable to decode commands received from the circuitry for execution by the apparatus; and where the circuitry is operable to propagate a first command of the plurality of commands to the decoder based on determining that the first command is included in a set of valid commands, and block a second command from being sent to the decoder based on a determination that the second command is absent from the set of valid commands.

In some cases, the circuitry may be further operable to switch from a first mode of operation of the memory device to a second mode of operation of the memory device based on determining that the second command is absent from the set of valid commands.

In some instances, the circuitry may be further operable to switch from the first mode of operation to the second mode of operation based on a quantity of received commands that may be not included in the set of valid commands satisfying a threshold.

In some examples, the circuitry may be further operable to receive, from the host device while operating in the second mode, a command sequence for resetting the memory device to the first mode, and switch the memory device from the second mode to the first mode based on receiving the command sequence.

In some cases, the circuitry may be further operable to transmit, to the host device, an indication that the second command may be not included in the set of valid commands.

In some instances, the circuitry may be further operable to transmit the indication based on a quantity of received commands that may be not included in the set of valid commands satisfying a threshold.

In some examples, the apparatus may include a buffer operable to store one or more commands of the set of commands based on determining that the second command may be absent from the set of valid commands.

In some cases, the circuitry may be further operable to receive, from the host device, a signal indicating a request for a stored command of the set of commands, and transmit, to the host device, an indication of the stored command.

In some instances, each of the set of commands may be received via a set of instruction pins, and where the set of valid commands includes a subset of a command space of combinations of the set of instruction pins.

In some examples, each of the set of commands may be received via a set of instruction pins and a set of address pins, and where the set of valid commands includes a subset of a command space of combinations of the set of instruction pins and the set of address pins.

Although certain features may be described herein with respect to or in the context of DRAM technology, this is for illustrative purposes only, and one of ordinary skill in the art will appreciate that the teachings herein may be applied to any type of memory device. For example, the teachings herein may be applied to volatile or non-volatile memory devices such as magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, at a memory device comprising a memory die, a command from a host device;
identifying a set of valid commands for a memory array of the memory die;
determining that the command is absent from the set of valid commands based at least in part on evaluating the command and the set of valid commands;
setting a mode register to a value based at least in part on determining that the command is absent from the set of valid commands, the value indicating a safe mode of operation for the memory device, the safe mode allowing execution of a read command and restricting execution of a write command; and
blocking, based at least in part on determining that the command is absent from the set of valid commands, the command from being decoded into an instruction and an address by a memory controller of the memory die.

2. The method of claim 1, further comprising:
switching from a first mode of operation of the memory device to the safe mode of operation of the memory device based at least in part on setting the mode register to the value and based at least in part on a time window associated with the command.

3. The method of claim 2, further comprising:
restricting access to at least one address of the memory array based at least in part on switching to the safe mode of operation.

4. The method of claim 2, further comprising:
operating at least one bank of the memory array in a self-refresh mode based at least in part on switching to the safe mode of operation.

5. The method of claim 2, further comprising:
restricting execution for at least one command of the set of valid commands based at least in part on switching to the safe mode of operation.

6. The method of claim 2, further comprising:
receiving, from the host device while operating in the safe mode, a command sequence for resetting the memory device to the first mode; and
switching the memory device from the safe mode to the first mode based at least in part on receiving the command sequence.

7. The method of claim 1, further comprising:
transmitting, to the host device, an indication that the command is absent from the set of valid commands.

8. The method of claim 1, wherein the set of valid commands is preconfigured in the memory device.

9. The method of claim 1, further comprising:
receiving, from the host device, a signal indicating the set of valid commands.

10. The method of claim 1, wherein the command comprises the instruction and the address.

11. A method, comprising:
receiving, from a host device at a memory device comprising a memory array, a command for an operation by the memory device;
determining a validity of the command by comparing the command to a set of valid commands;
changing a value at a register based at least in part on determining the validity of the command, the value corresponding to a quantity of commands determined to be invalid and a time window associated with receiving the quantity of commands; and
transmitting, to the host device, feedback including the command and an indication of the validity of the command based at least in part on changing the value at the register, the feedback indicating a safe mode of operation for the memory device, the safe mode allowing execution of a read command and restricting execution of a write command.

12. The method of claim 11, further comprising:
transmitting the indication based at least in part on the quantity of commands determined to be invalid satisfying a threshold.

13. The method of claim 12, further comprising:
receiving a signal indicating the threshold from the host device.

14. A method, comprising:
receiving, at a memory device comprising a memory die, a plurality of commands from a host device;
determining whether each command of the plurality of commands is included in a set of defined commands for a memory array of the memory die;
decoding a first command of the plurality of commands for execution on the memory array of the memory die based at least in part on determining that the first command is included in the set of defined commands;
setting a mode register to a value based at least in part on determining that a second command of the plurality of commands is absent from the set of defined commands, the value indicating a safe mode of operation for the memory device, the safe mode allowing execution of a read command and restricting execution of a write command; and blocking the second command of the plurality of commands from being decoded into an instruction and an address by a memory controller of the memory die based at least in part on determining that the second command is absent from the set of defined commands.

15. The method of claim 14, further comprising:
determining a quantity of commands of the plurality of commands that are absent from the set of defined commands; and
comparing the quantity to a threshold.

16. The method of claim 15, further comprising:
switching from a first mode of operation of the memory device to a second the safe mode of operation of the memory device based at least in part on determining that the quantity satisfies the threshold and a time window associated with receiving the quantity of commands.

17. The method of claim 15, further comprising:
transmitting, to the host device, an indication that the quantity satisfies the threshold.

18. The method of claim 15, further comprising:
receiving, from the host device, a signal indicating the threshold.

19. The method of claim 14, further comprising:
storing one or more commands of the plurality of commands based at least in part on determining that the one or more commands are absent from the set of defined commands; and
transmitting, to the host device, an indication of the one or more commands.

20. The method of claim 14, further comprising:
storing the set of defined commands at the memory device.

21. A method, comprising:
transmitting, to a memory device, a command for an operation on a memory array of the memory device;
receiving, at a host device, from the memory device in response to the command and based at least in part on a time window associated with the command, feedback including the command and an indication that the command as received at the memory device is absent from a set of valid commands for the memory device, the feedback indicating a safe mode of operation for the memory device, the safe mode allowing execution of a read command and restricting execution of a write command;
processing a second command for the memory device based at least in part on the indication; and
transmitting, to the memory device, the second command.

22. The method of claim 21, further comprising:
receiving, from the memory device, an indication that the memory device has switched from a first mode of operation to a second mode of operation based at least in part on the command.

23. The method of claim 22, further comprising:
transmitting, to the memory device while the memory device is operating in the second mode, a command sequence for resetting the memory device to the first mode.

24. The method of claim 21, further comprising:
transmitting, to the memory device, a command sequence that includes the second command, the command sequence for adding the command to the set of valid commands.

25. The method of claim 21, further comprising:
transmitting, to the memory device, a request for a representation of the command as received by the memory device; and
receiving, from the memory device, an indication of the representation of the command.

* * * * *